US009296270B2

(12) United States Patent
Parks et al.

(10) Patent No.: US 9,296,270 B2
(45) Date of Patent: Mar. 29, 2016

(54) COMBINED SUBMERSIBLE VESSEL AND UNMANNED AERIAL VEHICLE

(71) Applicant: Aurora Flight Sciences Corporation, Manassas, VA (US)

(72) Inventors: Robert Parks, San Jose, CA (US); Adam Woodworth, Melrose, MA (US); Tom Vaneck, Gloucester, MA (US); Justin McClellan, Boston, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 288 days.

(21) Appl. No.: 13/765,144

(22) Filed: Feb. 12, 2013

(65) Prior Publication Data
US 2014/0026802 A1 Jan. 30, 2014

Related U.S. Application Data

(63) Continuation of application No. 13/494,529, filed on Jun. 12, 2012, now abandoned, which is a continuation of application No. 12/484,557, filed on Jun. 15, 2009, now abandoned.

(60) Provisional application No. 61/061,989, filed on Jun. 16, 2008.

(51) Int. Cl.
*B60F 5/02* (2006.01)
*B64C 39/02* (2006.01)
*F42B 15/20* (2006.01)

(52) U.S. Cl.
CPC .............. *B60F 5/02* (2013.01); *B64C 39/024* (2013.01); *F42B 15/20* (2013.01); *B64C 2201/021* (2013.01); *B64C 2201/042* (2013.01); *B64C 2201/102* (2013.01); *B64C 2201/127* (2013.01); *B64C 2201/165* (2013.01)

(58) Field of Classification Search
CPC .......... B64G 1/409; B60F 5/02; F42B 15/20; F42B 15/22; B64C 2201/165; B64C 2201/167
See application file for complete search history.

(56) References Cited

U.S. PATENT DOCUMENTS

| 3,092,060 | A | 6/1963 | Reid | |
| 5,237,952 | A | 8/1993 | Rowe | |
| 5,373,800 | A | 12/1994 | Steinberg | |
| 8,314,374 | B2 * | 11/2012 | Uzman | B64C 39/024 244/3.11 |
| 9,010,678 | B1 * | 4/2015 | Hiller | B60F 5/02 244/2 |

FOREIGN PATENT DOCUMENTS

FR 2974760 A1 * 11/2012 ............... B60F 5/02

* cited by examiner

*Primary Examiner* — Brian M O'Hara
(74) *Attorney, Agent, or Firm* — Katten Muchin Rosenman LLP

(57) ABSTRACT

A combined submersible vessel and unmanned aerial vehicle preferably includes a body structure, at least one wing structure, at least one vertical stabilizer structure, and at least one horizontal stabilizer structure. A propulsion system is coupled to the body structure and is configured to propel the flying submarine in both airborne flight and underwater operation. Preferably, the propulsion system includes a motor, a gearbox coupled to the motor and configured to receive power generated by the motor and provide variable output power, a drive shaft coupled to the gearbox and configured to transfer the variable output power provided by the gearbox, and a propeller coupled to the drive shaft and configured to accept power transferred to it from the drive shaft. The propeller is further configured to rotate and propel the flying submarine in both an airborne environment and in an underwater environment.

39 Claims, 26 Drawing Sheets

| Air operation only | |
|---|---|
| Airborne Range (nm) at 50 knots | 165 |
| Airborne Loiter (minutes) | 0 |
| Waterborne Range (nm) at 5 knots | 0 |
| Waterborne Loiter (minutes) | 0 |
| Long Air + Underwater operation (no loiter) | |
| Airborne Range (nm) at 50 knots | 50 |
| Airborne Loiter (minutes) | 0 |
| Waterborne Range (nm) at 5 knots | 40 |
| Waterborne Loiter (minutes) | 0 |
| Air + Underwater operation (w/loiter) | |
| Airborne Range (nm) at 50 knots | 65 |
| Airborne Loiter (minutes) | 0 |
| Waterborne Range (nm) at 5 knots | 10 |
| Waterborne Loiter (minutes) | 480 |
| Air (w/loiter) + Underwater (w/loiter) | |
| Airborne Range (nm) at 50 knots | 60 |
| Airborne Loiter (minutes) | 60 |
| Waterborne Range (nm) at 5 knots | 5 |
| Waterborne Loiter (minutes) | 180 |
| Short Air + Underwater (no loiter) | |
| Airborne Range (nm) at 50 knots | 20 |
| Airborne Loiter (minutes) | 0 |
| Waterborne Range (nm) at 5 knots | 50 |
| Waterborne Loiter (minutes) | 0 |

COMBINED SUBMERSIBLE VESSEL AND UNMANNED AERIAL VEHICLE

This application is a continuation of U.S. patent application Ser. No. 13/494,529, filed Jun. 12, 2012, which is a continuation of U.S. patent application Ser. No. 12/484,557, filed Jun. 15, 2009 (now abandoned), which claims priority to U.S. Provisional Patent Application No. 61/061,989, filed Jun. 16, 2008, the entire contents of all incorporated herein by reference.

BACKGROUND OF THE INVENTION

The present invention relates to unmanned aerial vehicles, and unmanned submersible vehicles. More particularly, the invention relates to a combined submersible vessel and unmanned aerial vehicle, and to methods for operating same.

In today's security conscience environment, especially in view of the Sep. 11, 2001 terrorist attack on the World Trade Center, many countries, including the United States of America, are increasing their border surveillance resources. However, while security in terms of terrorism is omnipresent, many other agencies are also interested in border surveillance, including the Federal Bureau of investigation (FBI), the U.S. Drug Enforcement Agency (U.S. DEA), and the U.S. Border Patrol, as well as many other state and local government agencies. All of these U.S. agencies, and their foreign counterparts, are extremely interested in protecting their citizens from illegal immigration, narcotics, and other law breakers seeking to cross borders to evade or escape capture, or to commit other crimes.

Any one of the above-noted agencies wants to conduct what is known as intelligence, surveillance, and reconnaissance (ISR) operations below the surface of the water (to capture drug smugglers that are learning to make and use submersible vehicles), at the surface (especially the use of "cigarette" type speedboats), and above the surface (in the air, using multi-prop turbo-prop aircraft). Today this requires the use of multiple specialized assets: unmanned aerial vehicles (UAVs), unmanned underwater vehicles (UUVs), and unmanned submersible vehicles (USVs). Having one asset that can cover all three environments would be a very cost effective means of conducting ISR operations to capture and or prevent such lawbreaking activities.

In the past, efforts have been made to build true flying submarines, but with limited success. One well-known effort is the Reid Flying Submarine, which is described in "The Flying Submarine: The Story of the Invention of the Reid Flying Submarine," by Bruce Reid Heritage Books, Inc. (October 2004), and detailed in U.S. Pat. No. 3,092,060 to D. V. Reid. In the '060 patent, one propeller is used for surface and submerged propulsion, while another propeller is used for flight. Surface and submerged vehicles are described in U.S. Pat. No. 5,237,952 "Variable Attitude Submersible Hydrofoil", and U.S. Pat. No. 5,373,800 "Sea Vessel." Neither is capable of sustained flight.

Thus, a need exists for a surveillance asset with the ability to conduct ISR operations below the surface of the water, at the air-sea interface, and above the surface of the sea, in the air.

SUMMARY OF THE INVENTION

It is therefore a general feature of the present invention to provide a combined submersible vessel and unmanned aerial vehicle that will obviate or minimize problems of the type previously described.

According to a first aspect of the present invention, a flying submarine includes a body structure, at least one wing structure coupled to the body structure, at least one vertical stabilizer structure coupled to the body structure, and at least one horizontal stabilizer structure coupled to the body structure. A propulsion system is coupled to the body structure and is configured to propel the flying submarine in both airborne flight and underwater operation. Preferably, the propulsion system includes a motor, a gearbox coupled to the motor and configured to receive power generated by the motor and provide variable output power, a drive shaft coupled to the gearbox and configured to transfer the variable output power provided by the gearbox, and a propeller coupled to the drive shaft and configured to accept power transferred to it from the drive shaft. The propeller is further configured to rotate and propel the flying submarine in both an airborne environment and in an underwater environment.

According to a second aspect of the present invention, a method for operating a flying submarine includes the steps of: (i) providing a rocket propulsion system to cause exhaust propulsive matter from the rocket propulsion system to propel the flying submarine; (ii) flooding a ballast tank with water; (iii) placing the flying submarine at an appropriate water exiting depth; (iv) accelerating the flying submarine to about a maximum forward velocity with a propeller propulsion system; (v) placing the flying submarine at a water exit angle; (vi) firing the rocket propulsion system at or just below a water-air interface, thereby providing an exhaust propulsive matter from the rocket propulsion system and propelling the flying submarine to a water exit velocity; (vii) unfolding one or more wing structures on the flying submarine to a flying position just at or above the water-air interface; and (viii) reversing the propeller propulsion system to operate the propeller in an airborne mode.

BRIEF DESCRIPTION OF THE DRAWINGS

The novel features and advantages of the present invention will best be understood by reference to the detailed description of the preferred embodiments that follows, when read in conjunction with the accompanying drawings, in which:

FIG. 19b shows a preferred design for the gearbox in perspective view. FIG. 19d shows only the high speed gears, while

FIG. 22 illustrates several specifications of the combined submersible vessel and unmanned aerial vehicle shown in FIG. 1 according to an embodiment of the present invention.

DETAILED DESCRIPTION OF THE PRESENTLY PREFERRED EMBODIMENTS

Figure 1:
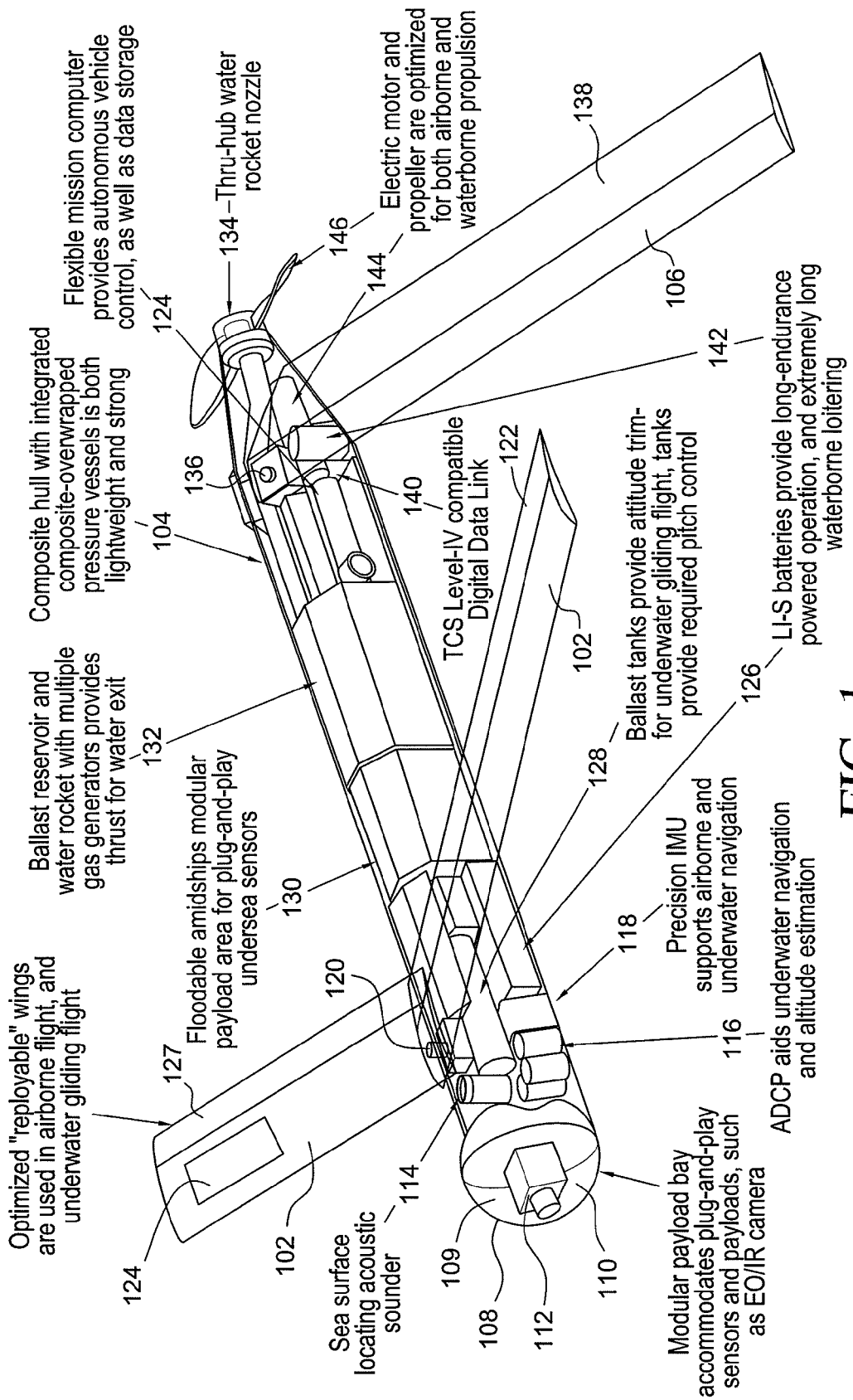
FIG. 1 illustrates a front perspective view of the combined submersible vessel and unmanned aerial vehicle according to an embodiment of the present invention.

The various features of the preferred embodiments will now be described with reference to the drawing figures, in which like parts are identified with the same reference characters. The following description of the presently contemplated best mode of practicing the invention is not to be taken in a limiting sense, but is provided merely for the purpose of describing the general principles of the invention.

Figure 12:
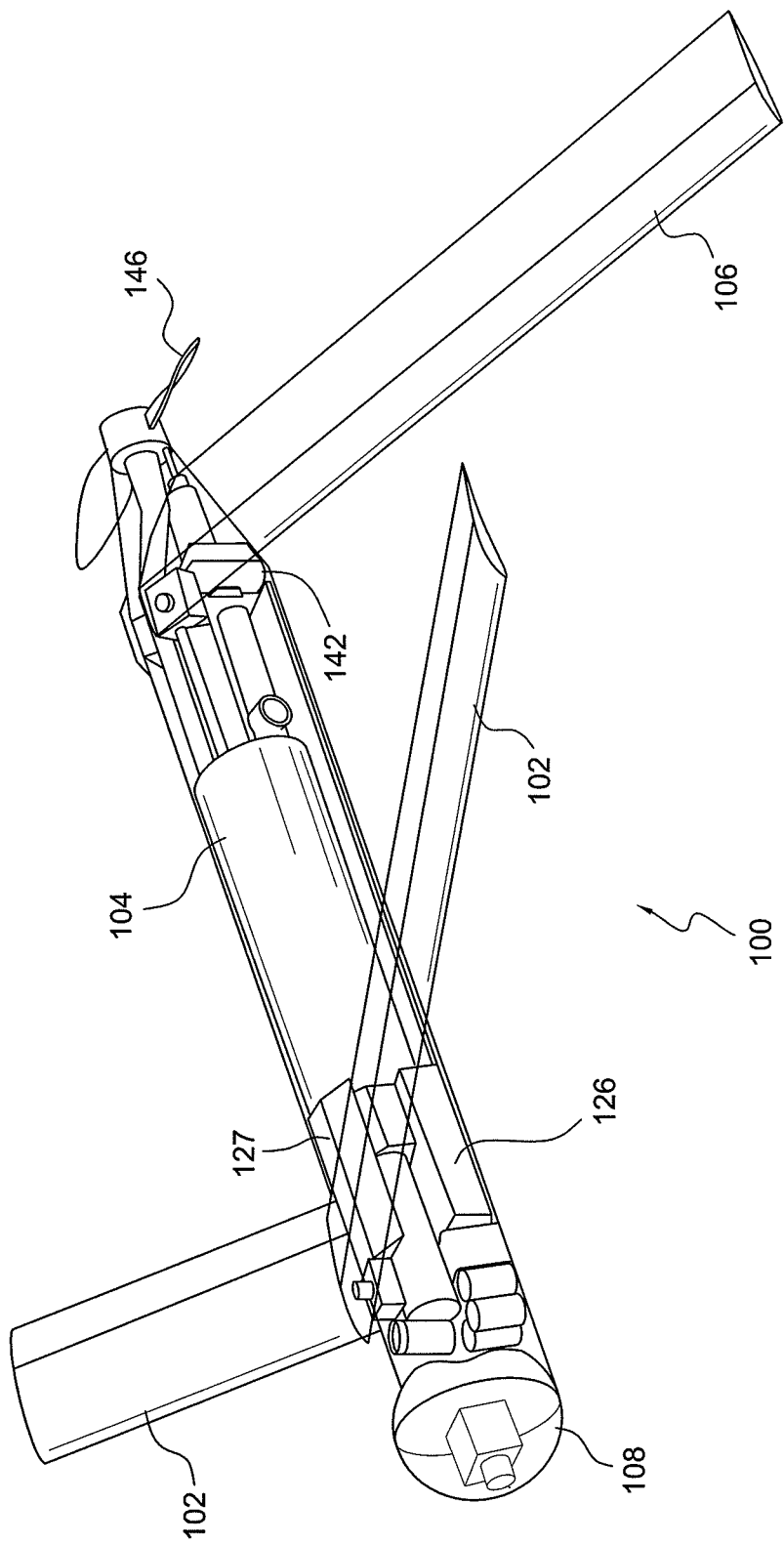
FIG. 12 illustrates the combined submersible vessel and unmanned aerial vehicle shown in FIG. 1 in a see-through view illustrating an electrical storage system according to an embodiment of the present invention.

According to an exemplary embodiment of the present invention, the combined submersible vessel and unmanned aerial vehicle (the "Pelican" or, "flying submarine") 100 is capable of both air and underwater operations. The flying submarine 100 includes the features of underwater buoyancy, gliding, and/or conventional propeller driven propulsion; re-deployable wings for multimode operation; chord-wise wing fold which doubles as control surface; a hydro-spike for water entry; means of re-launching from the water (either water rocket or solid fuel); modular nose payload bay (for different types of sensors); floodable center-body payload bay for measuring water salinity, temperature, contaminants, among others; conformal battery packs, as shown in FIG. 12; solar cells that is carried on the front and rear wings to recharge while loitering at the water's surface; magnetic coupling to drive the propeller without compromising the pressure vessel; air/water optimized electric propulsion system; air/water gearbox and propeller; reversible motor to change gear ratio through advanced gearbox design; ability to glide inverted when surfacing; water rocket powered by solid fuel, electrolyzed water, and compressed air, as shown in FIGS. 13-19; bi-directional folding propeller (forward for initial stowage, aft for water entry); bi-directional folding rear wings (same as propeller described above); spring-plus-servo system to rapidly fold wings for water entry, with powered deployment once in the water; combined ballast compartment/water rocket chamber to save volume; ability to be launched from site distant location to perform aerial intelligence, surveillance, and reconnaissance (ISR) while en route to transition point. According to another embodiment, flying submarine 100 can hover at or near the surface to gather energy, communicate, obtain a GPS fix, and perform near-surface ISR.

Preferably, the flying submarine is: approximately 1-6 meters long, more preferably 2-5 meters long, even more preferably 2-4 meters long, and most preferably 2 meters long; approximately less than or equal to 1 meter in diameter, more preferably, less than or equal to 0.5 meter in diameter, even more preferably less than or equal to 0.3 meter in diameter, and most preferably less than or equal to 0.2 meter in diameter; and weighs approximately 3-20 Kg, more preferably 5-15 Kg, even more preferably 7-12 Kg, and most preferably 10 Kg. The flying submarine may be deployed from aircraft, surface vessels, submarine vessels, or launched from shore facilities. Deployment may be in single units, or ripple-deployed in multiple unit salvos, using canisters, racks, tubes, etc. The flying submarine 100 may be recovered and reconditioned for further deployments, or it may be used in a fire-and-forget fashion.

Preferably, flying submarine 100 is used to operate autonomously, to obtain intelligence, conduct surveillance, and perform reconnaissance missions without direct supervisory control for most of the time. For example, flying submarine 100 preferably uses artificial intelligence software in a one or more processor-controlled flight control system to track drug-smuggling underwater boats, surface to report on the information, re-obtain position information from global positioning satellites, and then continue to monitor the same from a different position, as it flies, surface-swims, or submerged-swims to a new location to interdict the illicit underwater activities.

Flying submarine 100 reconfigures for water entry—the wings are stowed, and the propeller is folded prior to water entry. While submerged, flying submarine 100 performs underwater ISR. For long-endurance underwater operations, flying submarine 100 can re-deploy its wings and buoyancy glide underwater. To resume airborne operations, flying submarine 100 accelerates toward the sea surface and a fire a water-rocket just as the surface is breached. After returning to airborne mode, Pelican conducts aerial ISR and/or communications while en route to new transition point. The communications can be to/from ground-based, sea-based, aerial, or satellite-based platforms.

Flying submarine 100 preferably includes high-density energy storage. According to a further embodiment, packaging and buoyancy requirements suggest a vehicle energy source with very high energy density. Modern battery chemistries such as Li-Polymer and Li-Sulfur provide sufficient energy density.

Figure 2:
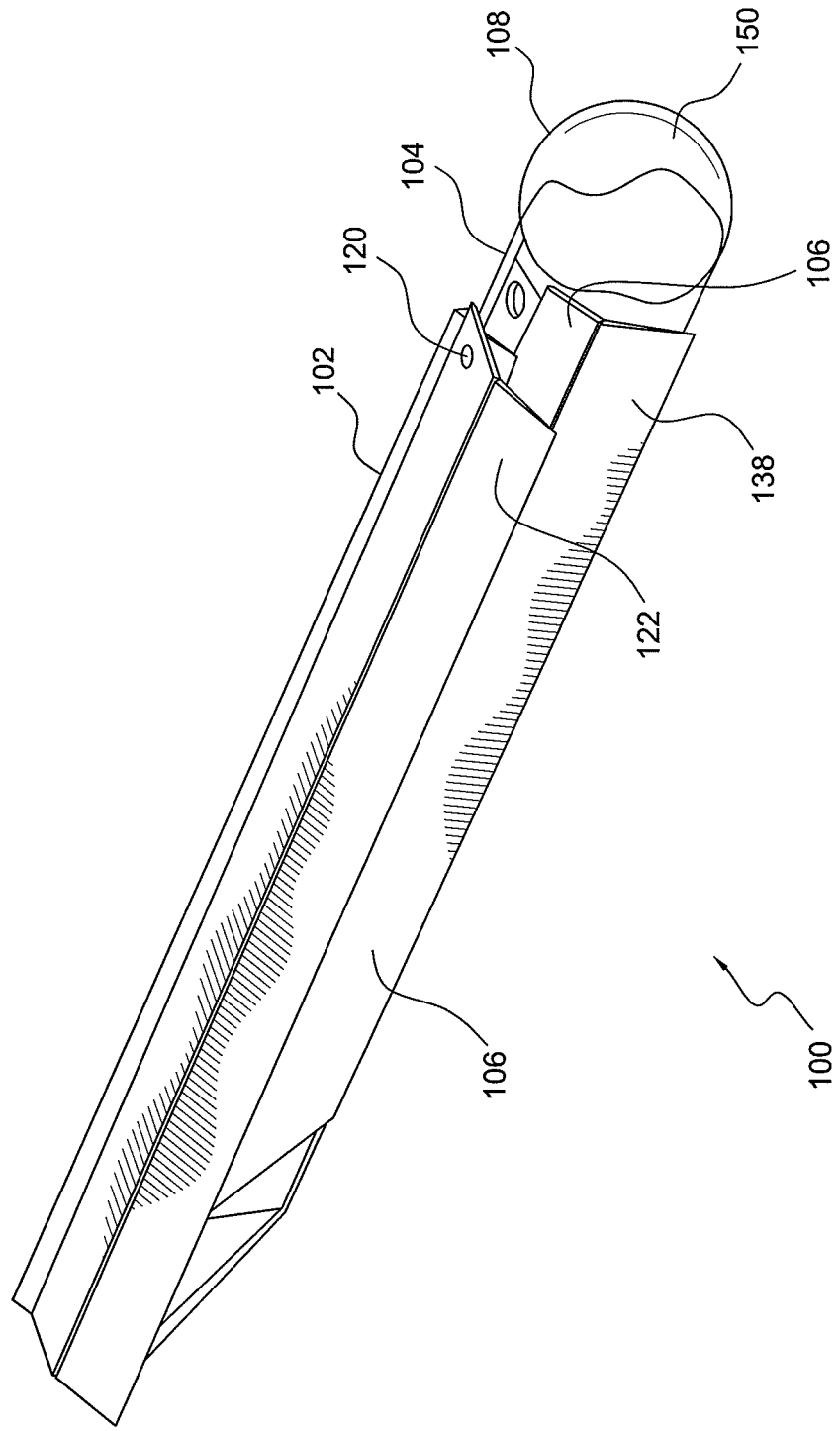
FIG. 2 illustrates the combined submersible vessel and unmanned aerial vehicle shown in FIG. 1 in a stored configuration according to an embodiment of the present invention.

Flying submarine 100 also preferably includes a body or hull 104, re-deployable forward wings 102, and re-deployable rear wings 106 wings. The hull 104 is preferably a composite hull with an integrated composite-over-wrapped pressure vessel that is lightweight, flexible, and strong. The wings of flying submarine 100 are repeatedly deployed and stowed (in two configurations) to accommodate different mission phases. The wing redeployment actuation mechanisms of flying submarine 100 can provide sufficient actuation authority to deploy and stow wings repeatedly, underwater, in the air, or on the surface, while moving or while stationary. While two wing positions are shown in FIGS. 1 and 2 (deployed and stowed), the forward and aft wings may be extended in any angle, depending on the type of flight/gliding desired. For example, the wings 102 and/or 106 may be configured to move between one or more of (i) a storage position, (ii) an airborne flight position, (iii) an underwater ascending position, (iv) an underwater descending position, (v) an underwater neutral-depth position, (vi) a water-entry position, and (vii) a water-exit position. Preferably, the wings are made of composites for strength and flexibility.

The nose 108 of flying submarine 100 includes a modular payload bay 110 that carries sensors 112, such as plug-and-play payloads and sensors, e.g., infrared cameras, electro-optical sensors, visible light cameras, SONAR, radar, etc. Preferably, the nose 108 is covered with a Lexan, glass, or plastic dome 109 to protect the sensors 112 and provide aerodynamic stability. Behind the nose 108 is a sea-surface locating acoustic sounder 114 used to locate the flying submarine 100 when traveling or loitering on the surface. Below the sounder 114 is an Acoustic Doppler Current Profiling (ADCP) instrument 116 to produce a record of water current velocities for a range of depths. Behind the ADCP 116 is a precision, integrated IMU/GPS (Inertial Measurement Unit/Global Positioning System) processor-based instrument 118 for aerial, sea-surface, and sub-surface navigation. Behind the IMU/GPS 118 is a compartment preferably containing one or more Li—S batteries 126 in a water-proof container. Placing the battery weight directly below the forward wings 102 improves flight and glide stability.

The forward wings 102 of flying submarine 100 are rotatably mounted to the body 104 with a rotation pin 120, which allows movement between a stowed (rearward swept) position and one or more deployed positions (perpendicular to the longitudinal axis of the flying submarine 100 or otherwise). The pin 120 may include one or more mechanical ratchet devices (not shown) to lock the wings into one or more of the above-described positions. One or more actuators (not shown) control the movement of each (or both) of the forward wings 102. Each forward wing 102 may include one or more flight control surfaces, such as ailerons 122, which are controlled in a known manner by a flight control computer 124. Each wing 102 may also include one or more solar panels 124 to recharge batteries 126 while the vehicle is in flight or loitering on the surface. In the deployed position(s), the front wings 102 have an upward dihedral angle of 1-30 degrees, and more preferably 5-20 degrees, even more preferably 7-15 degrees, and most preferably 10 degrees (see FIGS. 1, 7, and 10-13). The wings are preferably made of composites, similar to known UAV wings, which are light and strong.

Preferably above the batteries 126 is disposed one or more ballast tanks 128 which are used to control diving, rising, and submerged operations is a known manner. The ballast tanks 128 are controlled by one or more activatable valves (not shown), controlled by computer 124. Aft of the batteries 126 is one or more floodable amidships modular payload area 130, which is designed to contain undersea sensors, such as plug-and-play SONAR, deployable sonar sensors, etc. This space may also be used as ballast, as needed. Aft of the payload area 130 is preferably a ballast reservoir and water rocket 132 (to be described in more detail below). Briefly, the water rocket reservoir cooperates with a propulsion system (to be described below) to generate a water rocket that flows aft, through a thru-hub water rocket nozzle 134 to provide thrust for propelling the flying submarine, preferably when it moves from subsurface into the air. The nozzle 134 may incorporate thrust-vectoring technology for maneuvering in the air, on the surface, or under the surface.

Rear wings 106 preferably have flight control surfaces (e.g., ailerons 138) and solar panels similar to forward wings 102. However, since the rear wings 106 act as horizontal and vertical stabilizers, the flight control surfaces may be differently configured and differently actuated. The control surfaces 138 are preferably controlled by computer 124. A rotation pin 136 allows the rear wings 106 to pivot between a stowed position (forward swept, under the stowed front wings 106), to a deployed position (perpendicular to the longitudinal axis of the flying submarine 100 or otherwise), to a water-entry position (where the rear wings 106 are swept aft; see FIG. 9). The pin 136 may include one or more mechanical ratchet devices (not shown) to lock the wings into one or more of the above-described positions. One or more actuators (not shown) control the movement of each (or both) of the rear wings 106. In the deployed position(s), the rear wings 106 have an downward dihedral angle of 1-60 degrees, more preferably 10-50 degrees, even more preferably 20-40 degrees, and most preferably 30 degrees (see FIGS. 1, 7, and 10-13).

Near the mission computer 124 is preferably disposed a Tactical Control System (TCS) Level IV compatible digital data link 140, which is the software, software-related hardware and extra ground support hardware used for the remote control of the UAV. The TCS 140 also provides connectivity to identified Command, Control, Communications, Computers, and Intelligence (C4I) systems. The software provides the UAV operator the necessary tools for computer related communications, mission tasking, mission planning, mission execution, data processing, and data dissemination. The software also provides a high resolution, computer generated, graphics user interface that enables a UAV operator that is trained on one system to control different types of UAVs or UAV payloads with minimal additional training. The TCS has an open architecture and is capable of being hosted on computers that are typically supported by the using entity. Preferably, a Tactical Common Data Link (TCDL) within the TCS is used for communicating with assets such as aerial, space-based, surface, ground, and submerged platforms.

Preferably located beneath rotation pin 136 is another set of Li-s batteries 142, in a compartment with a water-proof container for holding the batteries 142. Again, lacing the battery weight directly below the rear wings 106 improves flight and glide stability. Aft of batteries 142 is one or more electric motors 144 configured to power a propeller 146 in both airborne and seaborne operations.

FIG. 2 is a perspective view of the flying submarine 100 in the stowed or stored position. In this position, the flying submarine may rest in canisters, racks, tubes, or other deployment structure. The flying submarine 100 may be in this configuration prior to deployment, or during deployment for aerial, ground, surface, or subsurface platforms. Nose 108 may have a retractable cover 150 which can rotate, open, swing, to expose one of more of the sensors 112. One of the forward wings 102 is shown folded rearward about rotation pin 120, with control surface 122 in a folded configuration. Likewise, rear wing 106 is shown folded forward, with its control surface 138 also folded inward.

Figure 3:
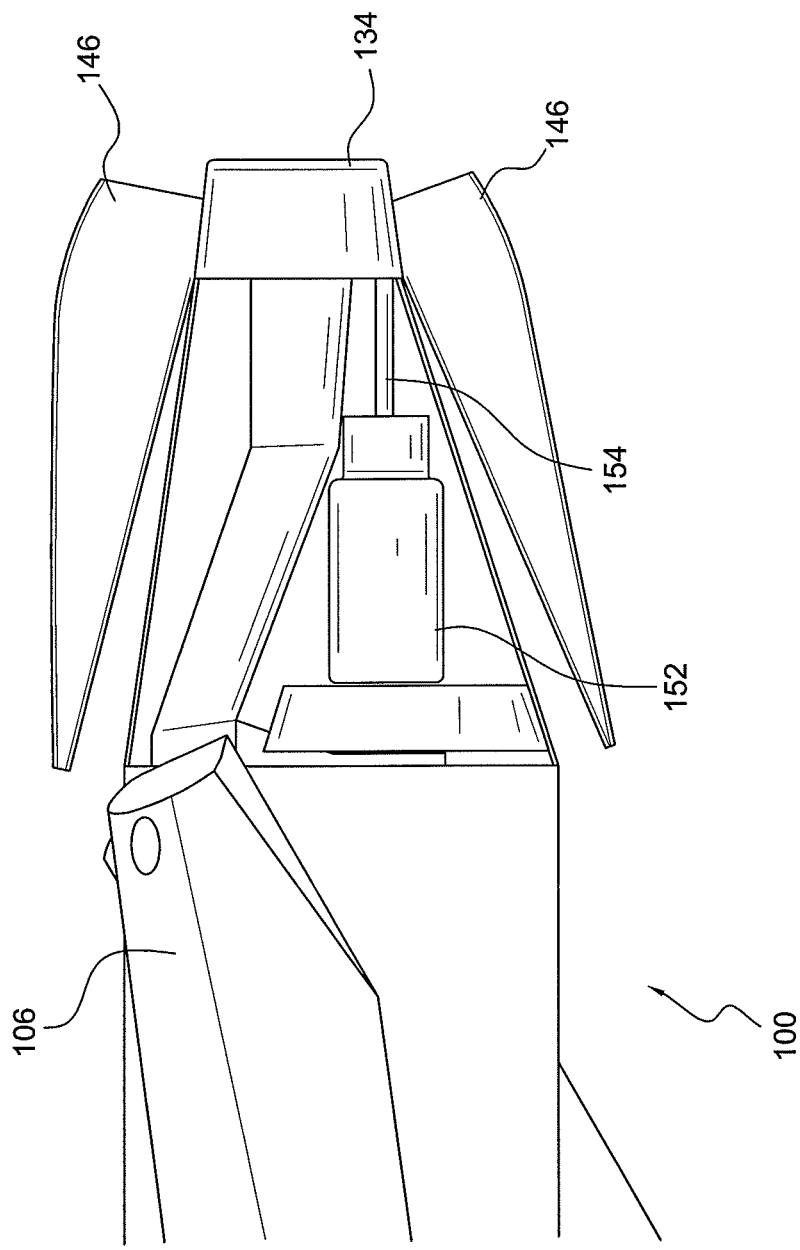
FIG. 3 illustrates a close up side view of the combined submersible vessel and unmanned aerial vehicle and forwarded folded propeller blades according to an embodiment of the present invention.
Figure 4:
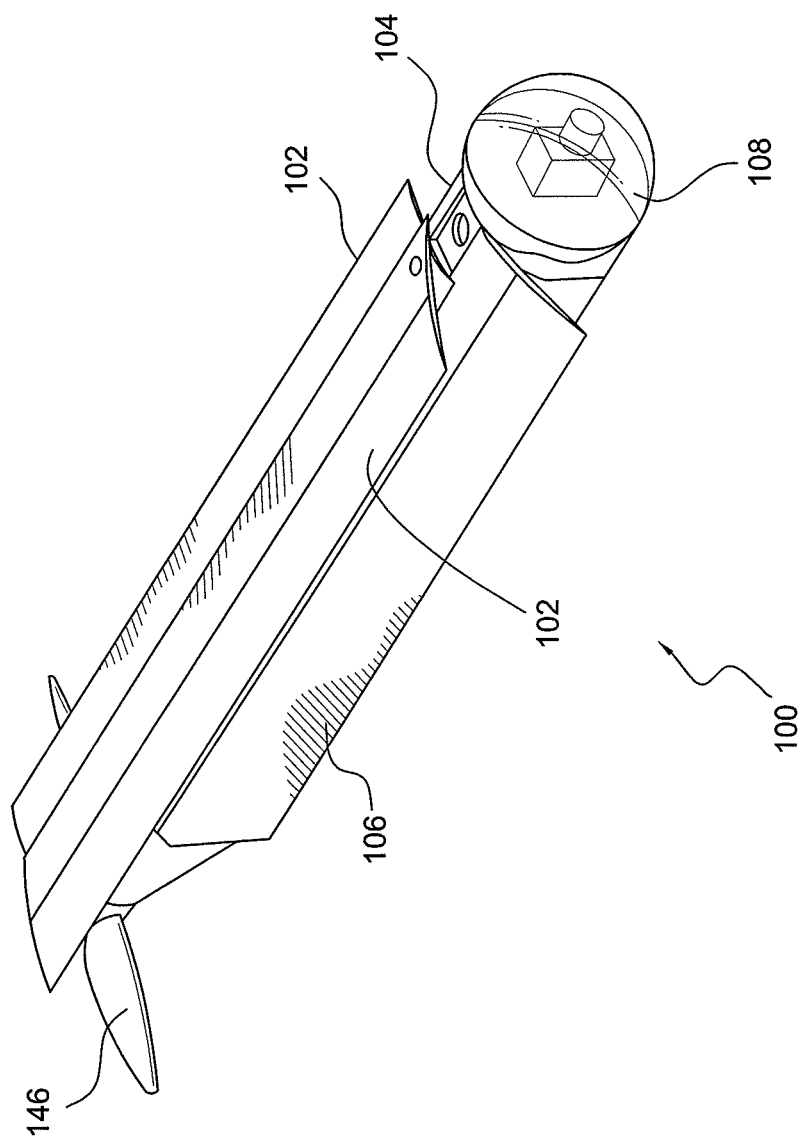
FIG. 4 illustrates the combined submersible vessel and unmanned aerial vehicle shown in FIG. 1 with the propeller blades extended according to an embodiment of the present invention.

FIG. 3 is a close up side view of the flying submarine 100 in the stowed position showing a rear wing 106 in the folded-forward position, and the propeller blades 146 also in a folded-forward position. In drive mode, a gearbox 152 and a drive shaft 154 drive the propeller blades 146 through a geared mechanism (not shown) adjacent the propeller hub. FIG. 4 is a perspective view of the flying submarine 100 showing the propeller blades 146 extended for flight, surface, or subsurface operations.

Figure 5:
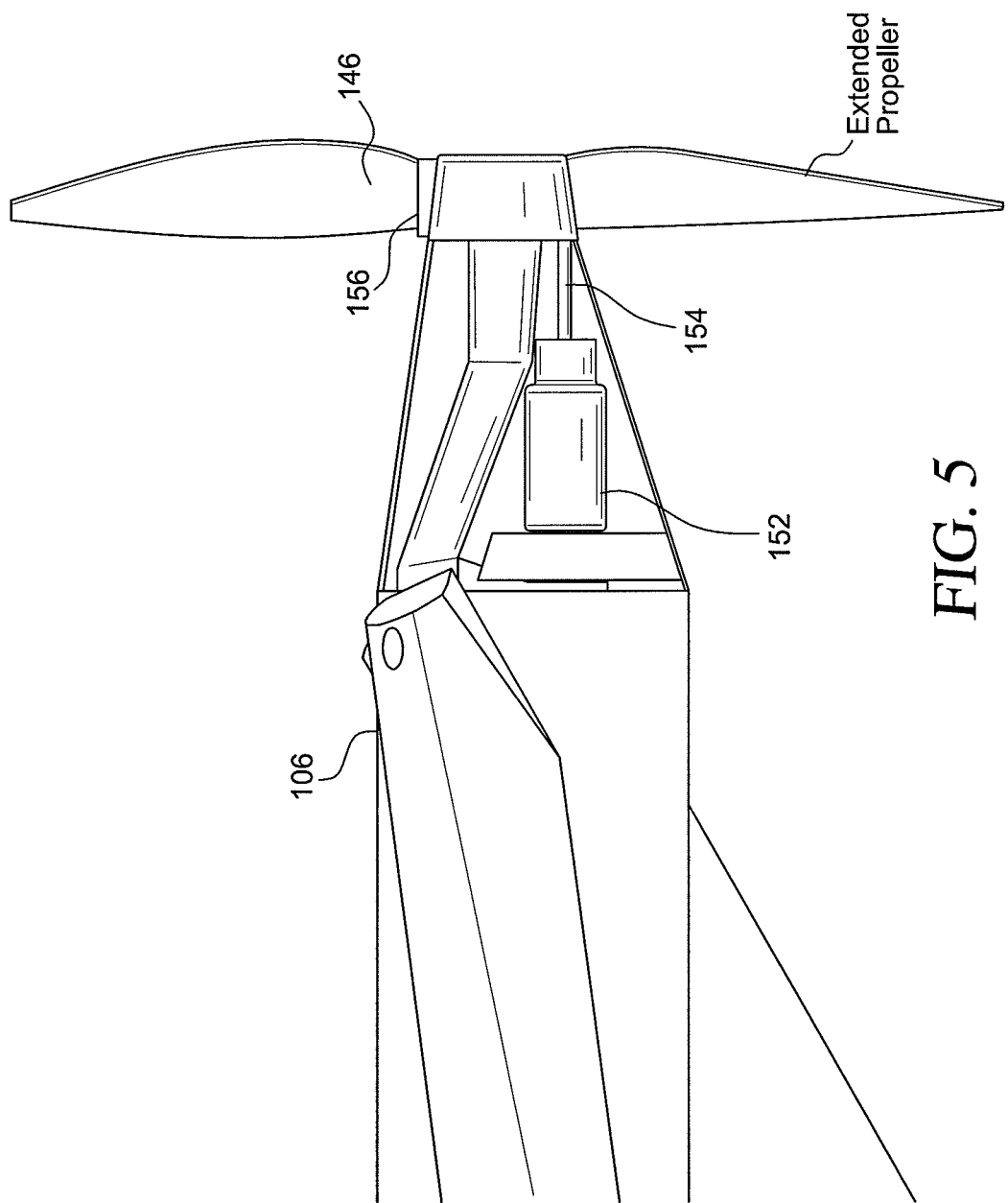
FIG. 5 illustrates a close up side view of the combined submersible vessel and unmanned aerial vehicle shown in FIG. 4 with the propeller blades extended according to an embodiment of the present invention.

FIG. 5 is a close up side view of the flying submarine 100 in the stowed position showing the propeller blades 146 extended. The flying submarine 100 has an efficient multimedia propulsion system (to be described in more detail below). According to the preferred embodiments, a single propulsion system (motor 146, gearbox 152, drive shaft 154, and propeller blades 146) for flying submarine 100 is used where the system operates efficiently both in the air and in the water. A single motor 144 and gearbox 152 provides an efficient method to turn the propeller 146 both in the air and in the water. A single, integral propeller 146 is preferably used where the propeller optimization balances efficiency in the air and the water. For airborne propulsion, the motor/gearbox provides an RPM reduction to maximize in-air efficiency of the propeller 146. For waterborne propulsion, the motor preferably reverses direction and the motor/gearbox provides an RPM reduction to maximize in-water efficiency of the propeller 146. The gearing and one way clutches preferably keep the propeller rotating in the same direction, regardless of the motor rotation direction. Reversing the motor, by means of its electronic controller, is a way to change the gear ratio without the need of additional actuators. According to a further embodiment, the RPM in the water is approximately $\frac{1}{6}^{th}$ of what it is in air (e.g., 3000 rpm in air). According to another embodiment, the RPM in the water is between $\frac{1}{3}^{rd}$ and $\frac{1}{6}^{th}$ of what it is in air. The actual motor RPM will depend on the type of motor used, but may be between 6000 rpm and 40000 rpm. According to still a further exemplary embodiment, the propeller 146 turns between about 5 times and about 10 times faster in the air than in the water.

The propeller preferably has a latching/pivot mechanism 156 that allows the blades to be stowed forward for launch and aft for water entry and exit. According to the preferred embodiments, flying submarine 100 further includes a propulsion system (to be described in greater detail below) enabling a smooth water-to-air transition. Upon leaving the water, flying submarine 100 rapidly accelerates to airborne cruise speed that is approximately 30× faster than its typical underwater cruise speed. The wings can be stowed, partially deployed, or fully deployed during the sea-to-air transition, or they may be variably deployed (full-to-swept or swept-to-full) during the transition as air speed increases.

Figure 6:
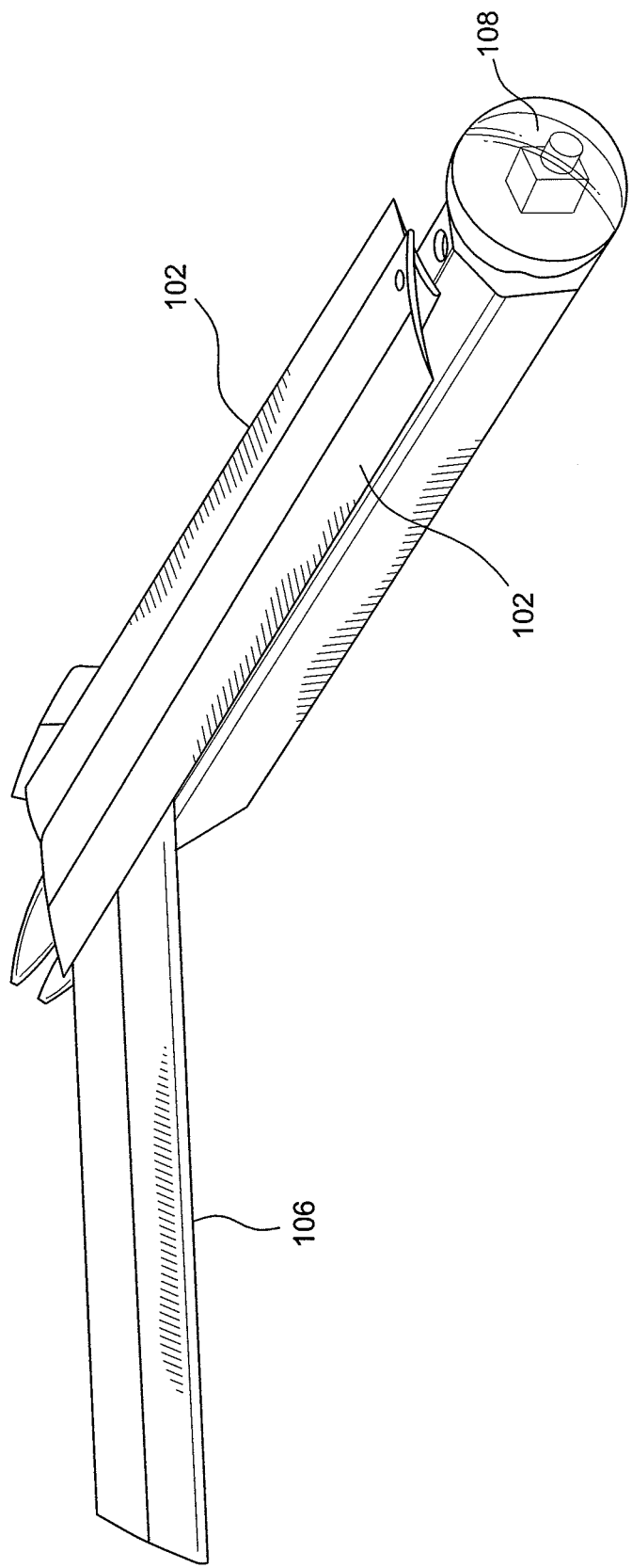
FIG. 6 illustrates the combined submersible vessel and unmanned aerial vehicle shown in FIG. 1 with a right rear wing extended according to an embodiment of the present invention.
Figure 7:
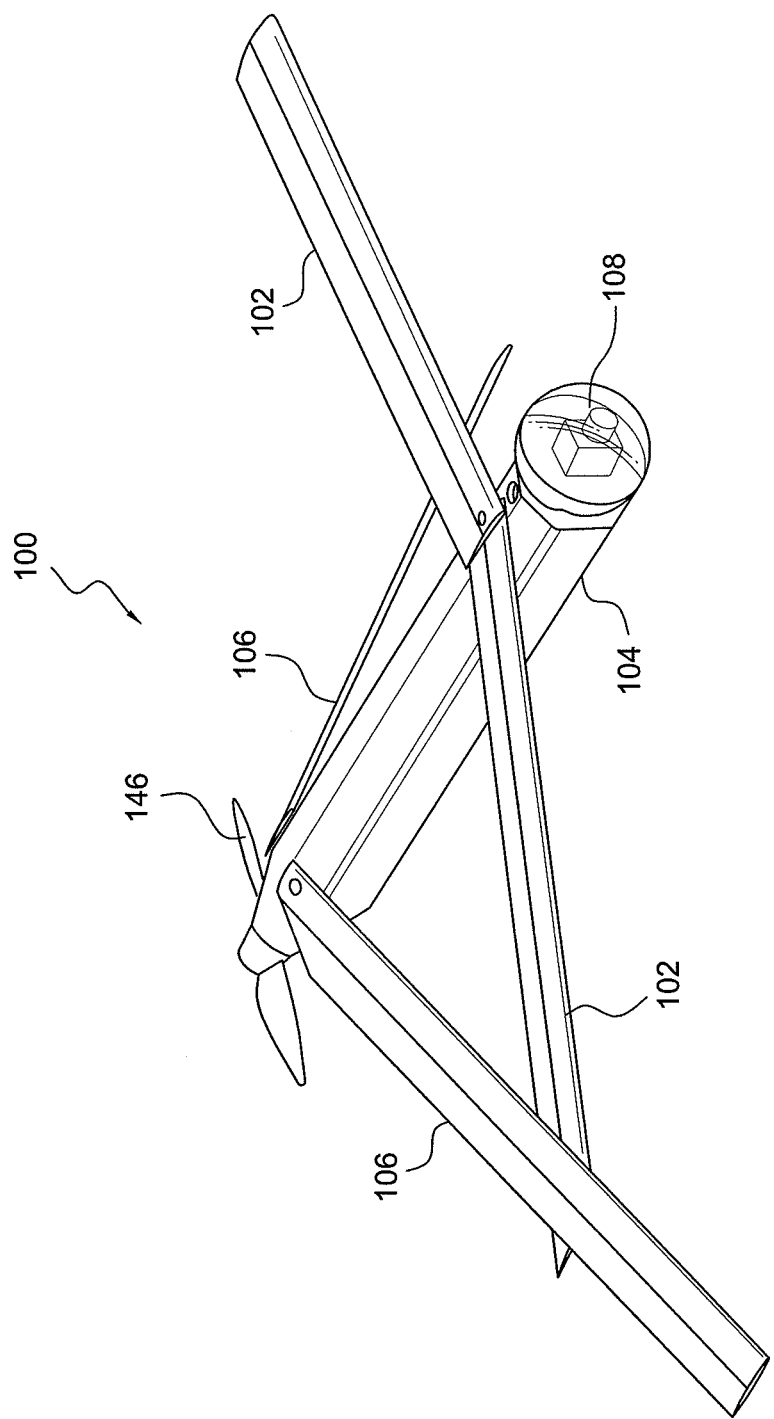
FIG. 7 illustrates a front perspective view of the combined submersible vessel and unmanned aerial vehicle shown in FIG. 1 with both front left and right wings and both rear left and right wings extended according to an embodiment of the present invention.
Figure 8:
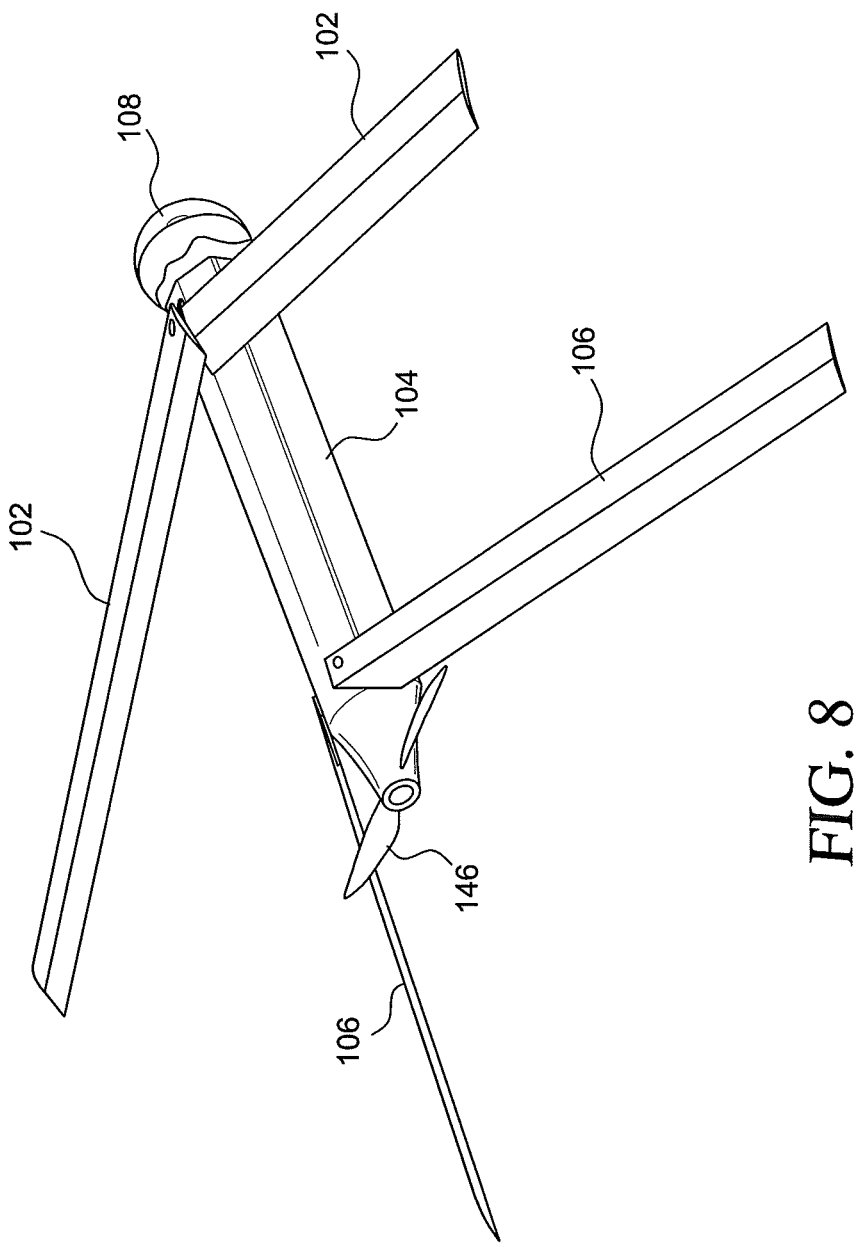
FIG. 8 illustrates a rear perspective view of the combined submersible vessel and unmanned aerial vehicle shown in FIG. 7 with both front left and right wings and both rear left and right wings extended according to an embodiment of the present invention.
Figure 9:
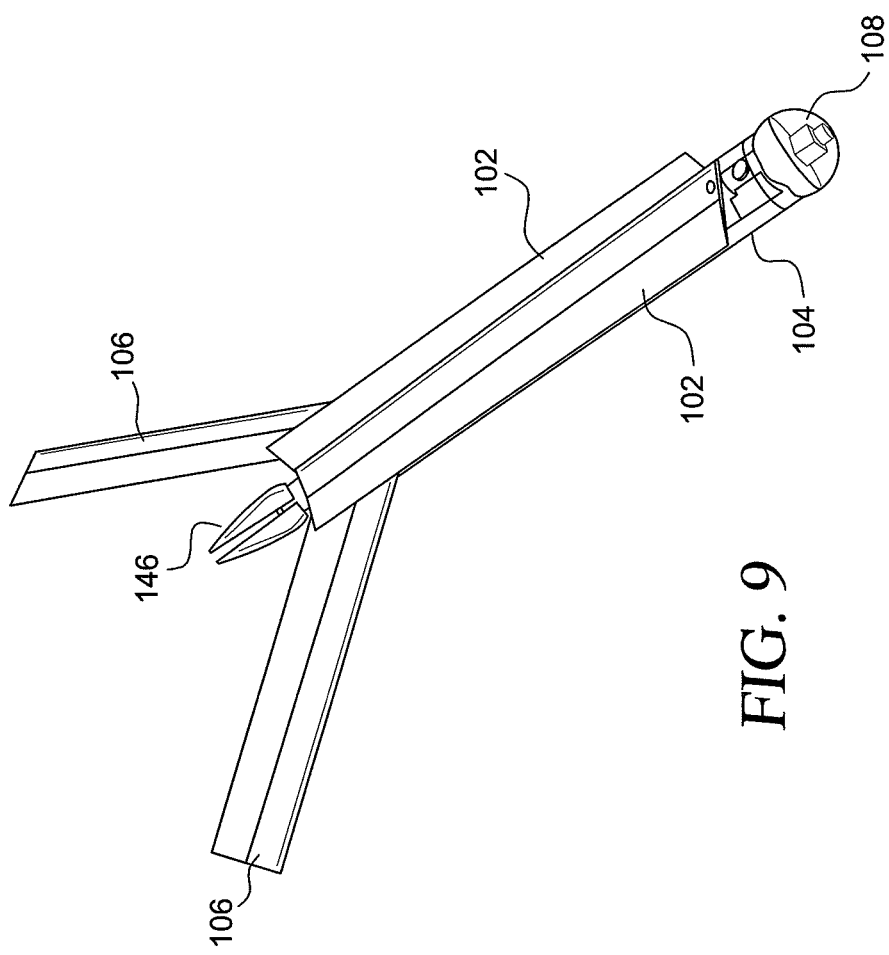
FIG. 9 illustrates a front perspective view of the combined submersible vessel and unmanned aerial vehicle shown in FIG. 1 in a water entry configuration, with both rear left and right wings folded back at about a 30° angle with respect to a centerline of the fuselage according to an embodiment of the present invention.

FIG. 6 is a perspective view showing the front wings 102 stowed, the rear wings deployed, and the propeller blades 146 in the water-entry position. FIG. 7 is a front perspective view of flying submarine 100 is the fully deployed configuration. The wings 102 and 106 are substantially perpendicular to the longitudinal axis of the hull 104, at their respective dihedral angles. FIG. 8 is a rear perspective view of flying submarine 100 is the fully deployed configuration. FIG. 9 is a side perspective view showing the flying submarine 100 in its dive configuration, right as the flying boat transitions from flight to subsurface gliding. Prior to entering the water, the flying submarine 100 is configured to fly at an altitude below about 100 feet and while at an airspeed just above a stalling speed of the flying submarine, the flying submarine is configured to reduce its speed to just below its stalling speed. The flying submarine is further configured to enter the water nose first and at an angle of between about 40° and 90° with respect to a surface of the water environment. As can be seen, the front wings 102 are folded in the stowed configuration, the rear wings are deployed approximately halfway between the stowed position and the fully deployed position, for immediate steerage upon water entry. Also, the propeller blades 146 are folded backward in a stowed position to reduce the impact of water entry. Preferably, the rear wings 106 are folded back at about a 30° angle with respect to a centerline of the fuselage. As soon as the flying submarine 100 slows to a sub sea cruising speed, the propeller blades 146 are deployed and engaged for subsurface thrust.

Figure 10:
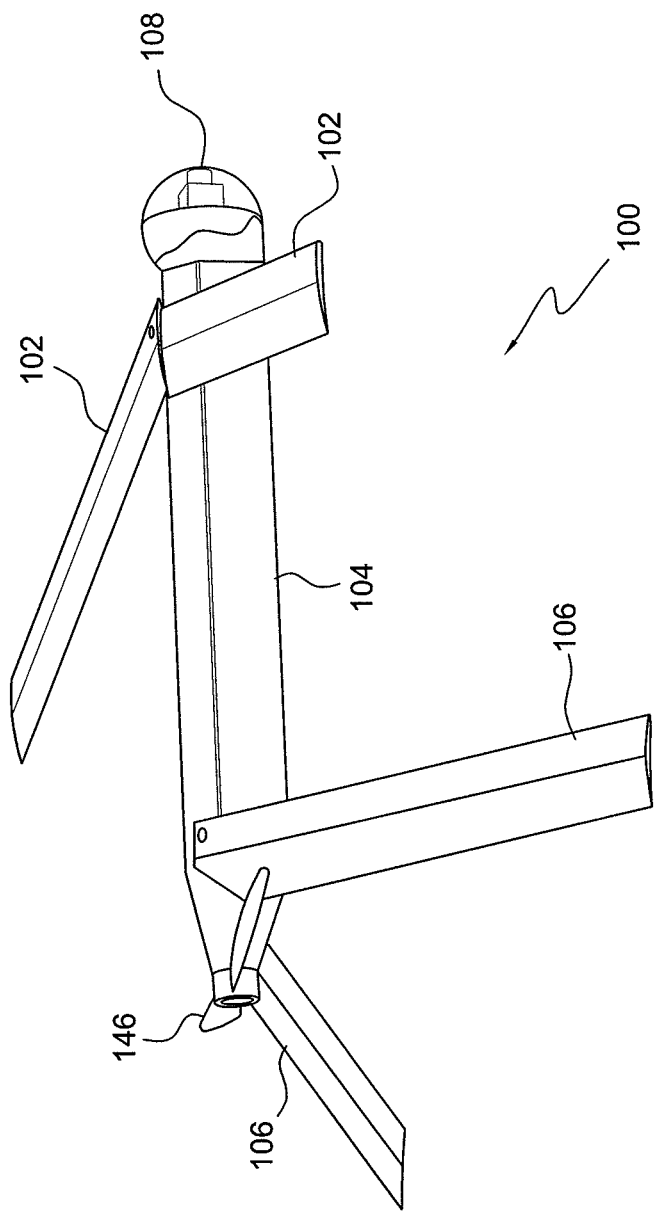
FIG. 10 illustrates a rear side perspective view of the combined submersible vessel and unmanned aerial vehicle shown in FIG. 1 under the water according to an embodiment of the present invention.

FIG. 10 shows a rear side perspective view of the flying submarine 100 under the water. The front wings 102 and rear wings 106 are fully deployed and their control surfaces are used to maneuver the flying submarine under water. The propeller blades 146 are fully deployed and provide forward thrust (or, perhaps rearward thrust in some embodiments), and the flying submarine cruises under water, as controlled by control surfaces and the computer 124. Note that the pitch of the propeller blades 146 may be adjusted for different conditions of under sea, surface, and aerial flight, although by careful design, a simple, fixed pitch prop, with the aforementioned variable ratio gearbox can work quite well for a wide range of airborne and subsurface operation. Preferably, when the flying submarine 100 is moving to a water-exit position it is inverted such that a lift vector of the partially or fully extended wings 102 and/or 106 is configured to push the inverted flying submarine downwards, thereby acting opposite to an upward buoyancy condition of the flying submarine. Thus, the flying submarine is configured to glide upwards toward the water-exit position, with the propeller 146 generating maximum thrust. When the flying submarine 100 is at an appropriate water-exit depth (e.g., 5 to 10 meters), the control surfaces are actuated to angle the flying submarine 100 upward at an appropriate water-exit angle (e.g., 20 to 40 degrees). The wings are deployed and the propeller accelerates the vehicle towards the surface at its maximum underwater speed.

Figure 11:
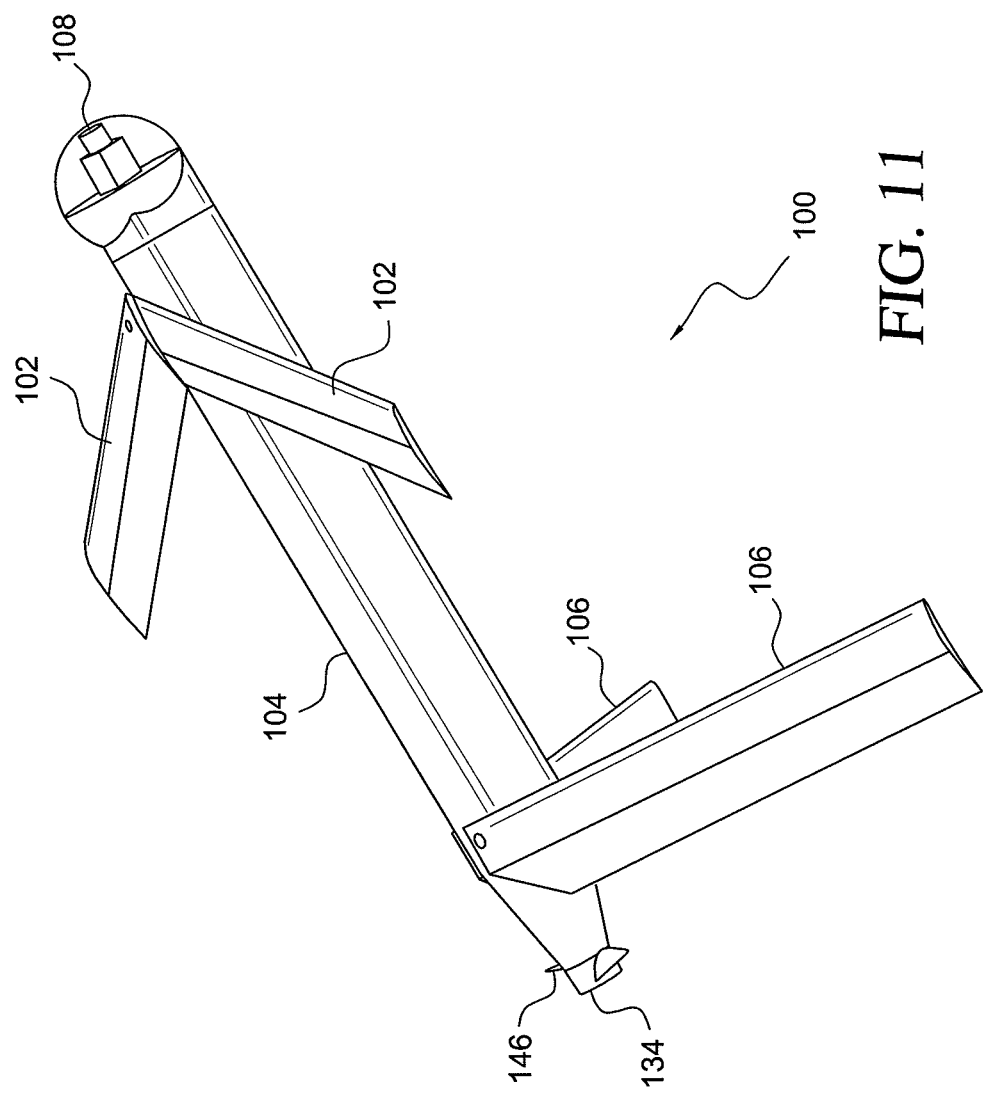
FIG. 11 illustrates a side perspective view of the combined submersible vessel and unmanned aerial vehicle shown in FIG. 10 as it is leaving or breaching the water according to an embodiment of the present invention.

FIG. 11 shows a side perspective view of the flying submarine 100 as it is leaving or breaching the water. Preferably, the front wings 102, the rear wings 106, and propeller blades 146 are then fully deployed, and the thru-hub rocket nozzle 134 is providing sufficient forward thrust to launch the flying submarine 100 into the air with sufficient velocity to sustain flight until the propeller 146 (preferably with motor rotation now reversed to change the gearbox to the high RPM mode for flight) generates sufficient forward thrust to propel the flying submarine 100 in flight. FIG. 12 shows the flying submarine 100 in a partial see-through view illustrating the electrical storage system in greater detail. batteries 126 are preferably disposed at or near the bottom of hull 104 and below the front wings 102. Preferably, another set of batteries 127 is disposed toward the top of hull 104, also beneath the front wings 102. The rear set of batteries 146 is shown disposed toward the bottom of hull 104, beneath the rear wings 106.

Figure 13:
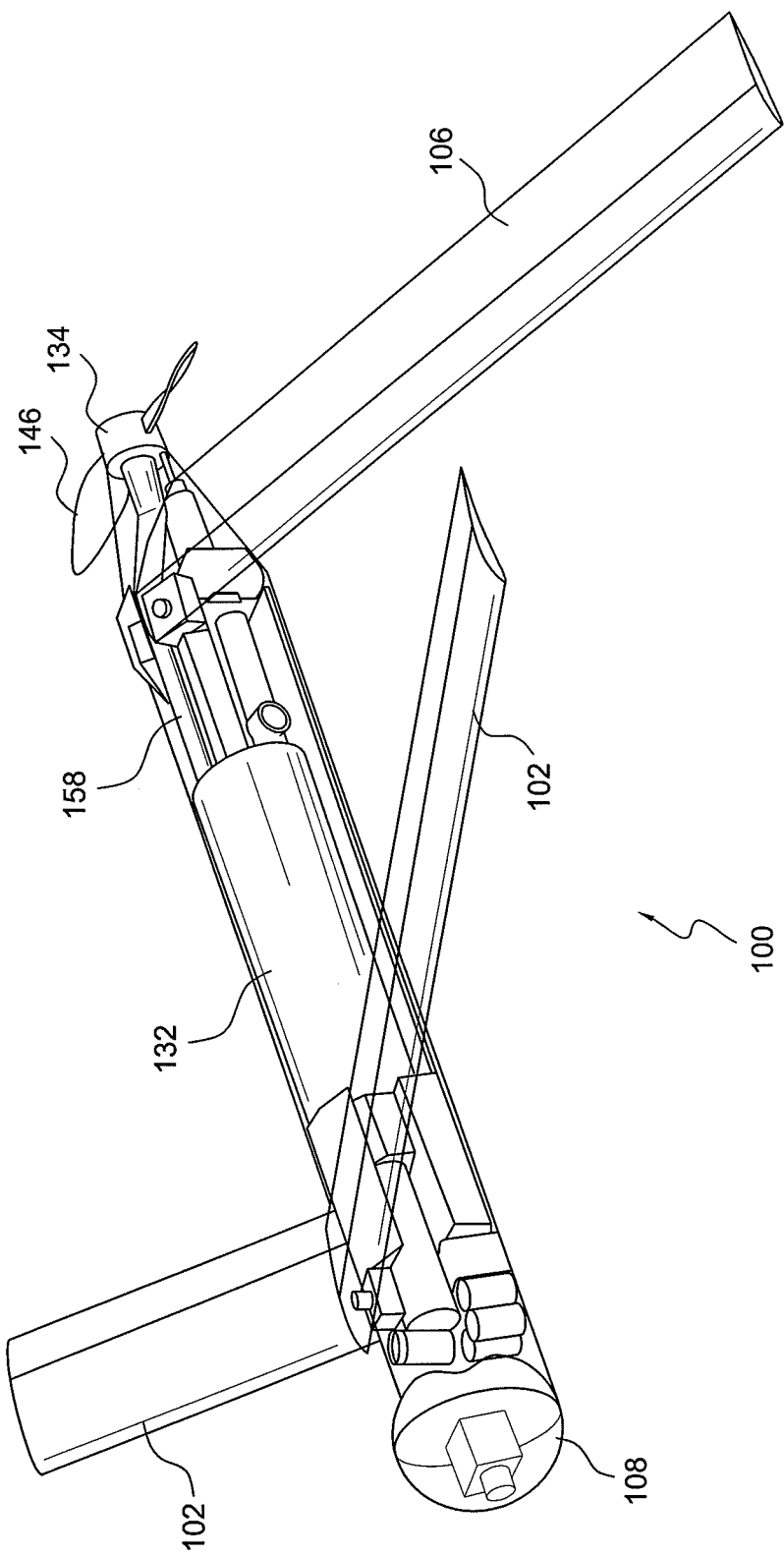
FIGS. 13-15 illustrate, in see-through views, a rocket propulsion system of the combined submersible vessel and unmanned aerial vehicle shown in FIG. 1 in a stored configuration according to an embodiment of the present invention, and FIG. 15 particularly illustrates a side view of folded propeller blades for ingress into the water and egress from the water according to a further embodiment of the present invention.
Figure 14:
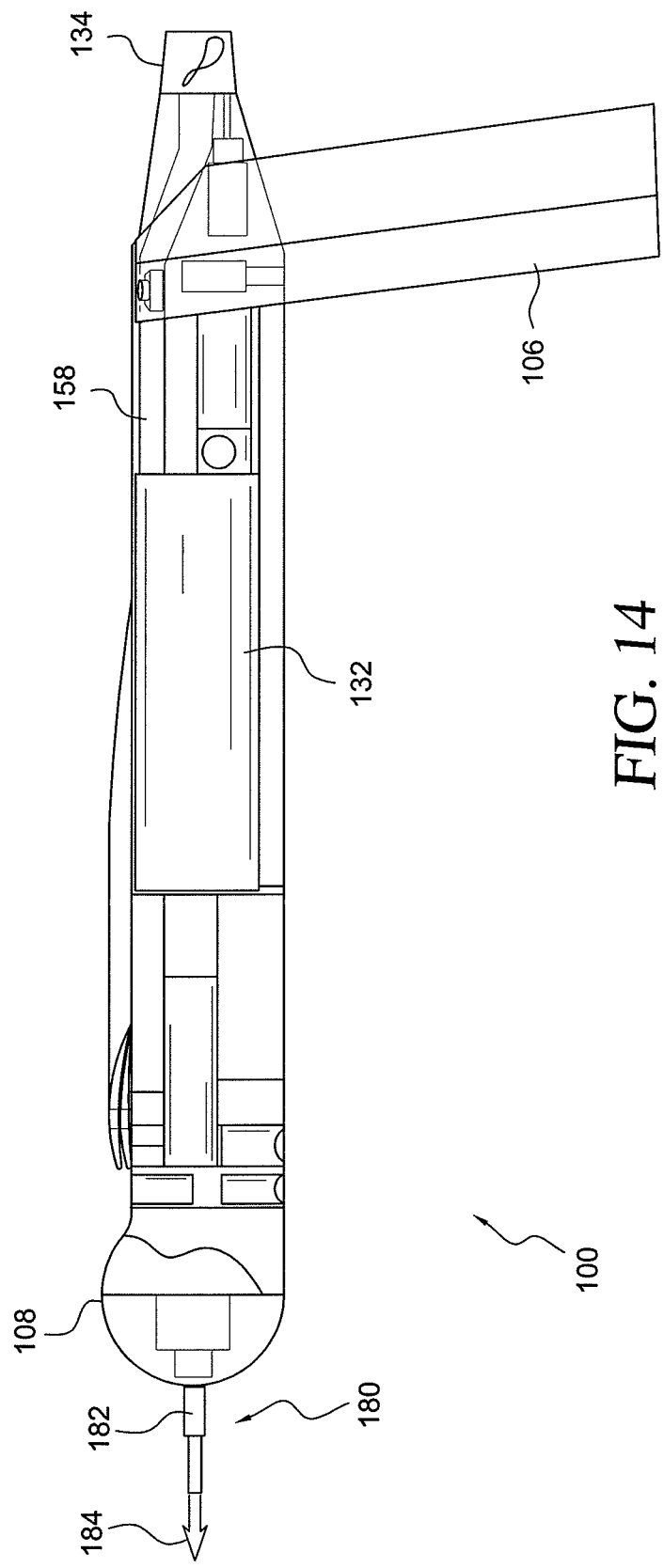
Figure 15:
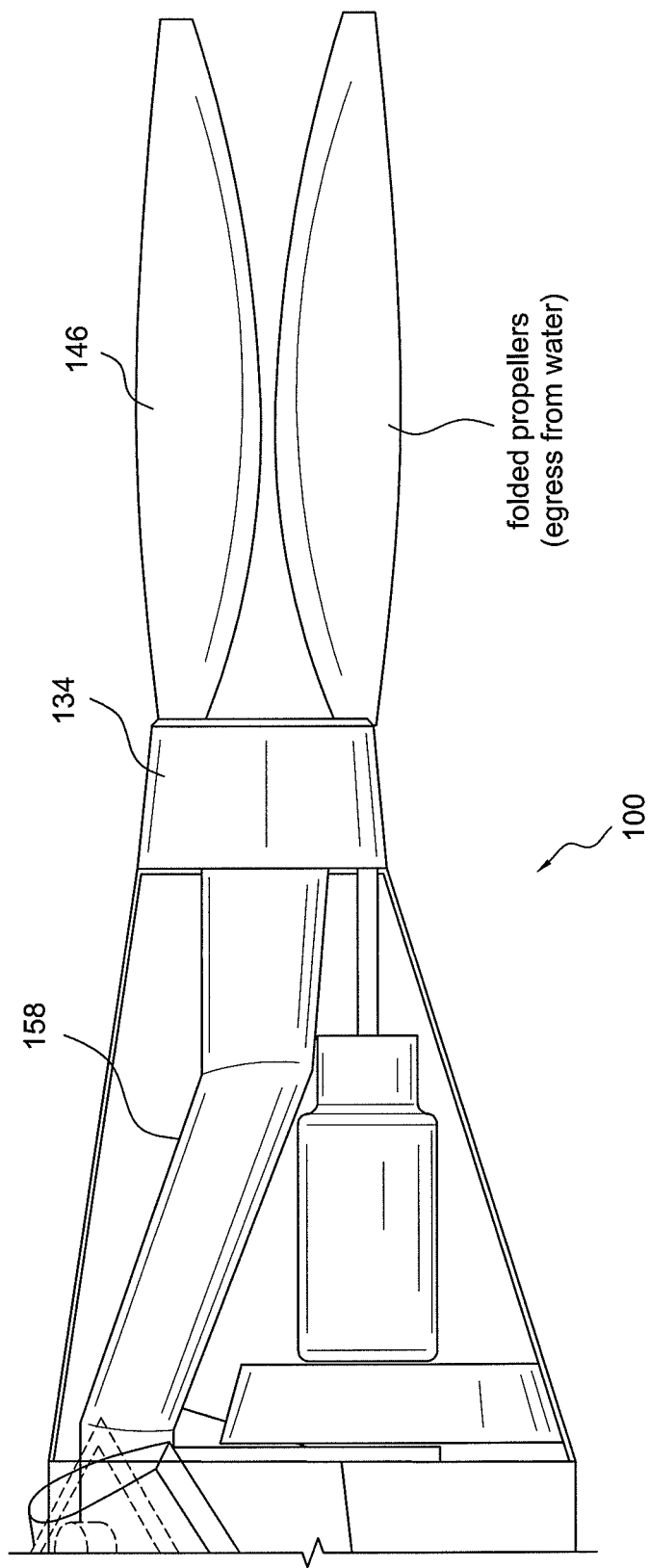

FIG. 13-15 show perspective, side, and close up views of the flying submarine 100 showing elements of the rocket propulsion system, including the reservoir 132 that acts as a water tank for water-rocket propulsion (to be described below) and as a ballast tank. Leading aft from the reservoir 132 is an exhaust tube 158 that carries pressurized water from the reservoir 132 to the rocket nozzle 134. A hydro-spike 180 coupled to the end of nose 108 is preferably used to make re-entry into the water much easier for flying submarine 100. The hydro-spike 180 preferably comprises an extendible pole 182, with a water deflecting device 184 coupled at the most extreme end of the hydro-spike pole 182. As the water deflecting surface of device 184 encounters the water, it creates a break in the water surface, mixing the water with air, making it less dense, and forcing it out of the way. Flying submarine 100 therefore experiences less loads upon its nose, wherein the most sensitive, expensive, and useful ISR devices are located.

One of several different rocket propulsion systems, as shown in FIGS. 16-19, may be used to rapidly pressurize a free-flooding water rocket to provide sufficient impulse to accelerate the vehicle from the sea to approximately its airborne cruise speed. According to a preferred embodiment, the rocket propulsion system shown in the attached figures, especially the sold-fuel rocket propulsion system, uses only one-third to one quarter as much fuel as a normal solid rocket with hot gas exhaust. According to a further embodiment, it is much more efficient and effective to expel water than gases, as the energy in the exhaust gas is equal to the mass flow rate time velocity squared, and the acceleration is equal to the mass flow rate times the velocity. Therefore, by moving a lot of water out of the nozzle 134, the flying submarine 100 can produce a lot of acceleration quickly. Of course, alternative non-water rocket propulsion systems may be used such as solid rocket propellant or liquid fueled propellant.

Figure 16:
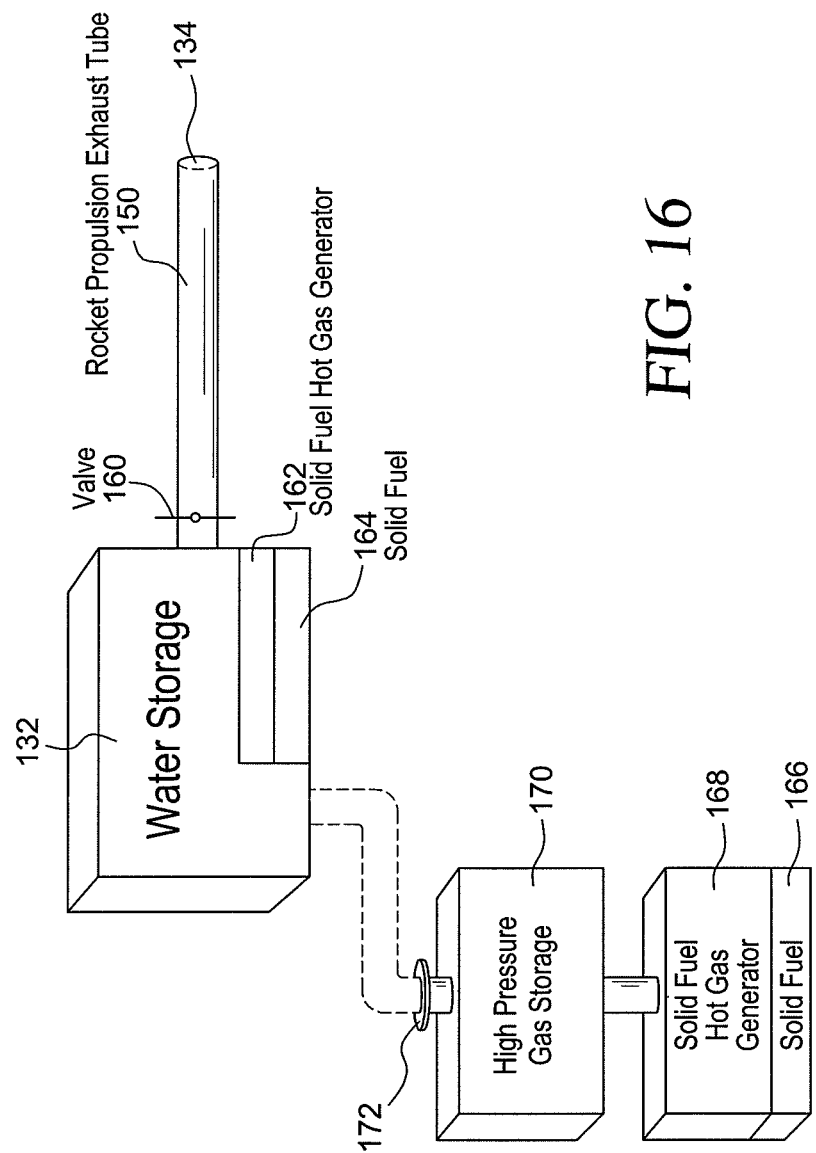
FIG. 16 illustrates a solid fuel rocket propulsion system for use in the combined submersible vessel and unmanned aerial vehicle shown in FIG. 1 according to an embodiment of the present invention.

The propulsion system shown in FIG. 16 uses one or multiple solid fuel cells 164 to power a solid fuel hot gas generator 162 (both preferably disposed inside reservoir 132) to rapidly pressurize water in reservoir 132. The pressurized water transits exhaust tube 158 on its way to nozzle 134. A valve 160 is controlled by computer 124 to maximize thrust, and vary the thrust in accordance with the depth of the flying submarine and as it transitions to flight. The multiple solid fuel cells 164 may be used together or one-at-a-time to power one or more sea-to-air launches. According to a further embodiment, multiple, independent gas generators are used to allow the vehicle to transition between air and water several times; chemical-based gas generators, as well as catalytic or electrolysis-derived combustible materials, can also be used. One or more secondary solid fuel cells 166 may be used to power a secondary solid fuel hot gas generator 168 that provides high pressure gas to a high pressure gas storage chamber 170. The secondary structures are preferably not disposed in the reservoir 134. The stored high pressure gas may be metered into the reservoir 132 through valve 172, also under control of computer 124. The secondary fuel cells 168, gas generator 170, storage chamber 170, and valve 172 may be used instead of or in addition to the earlier-described propulsion structure.

Figure 17:
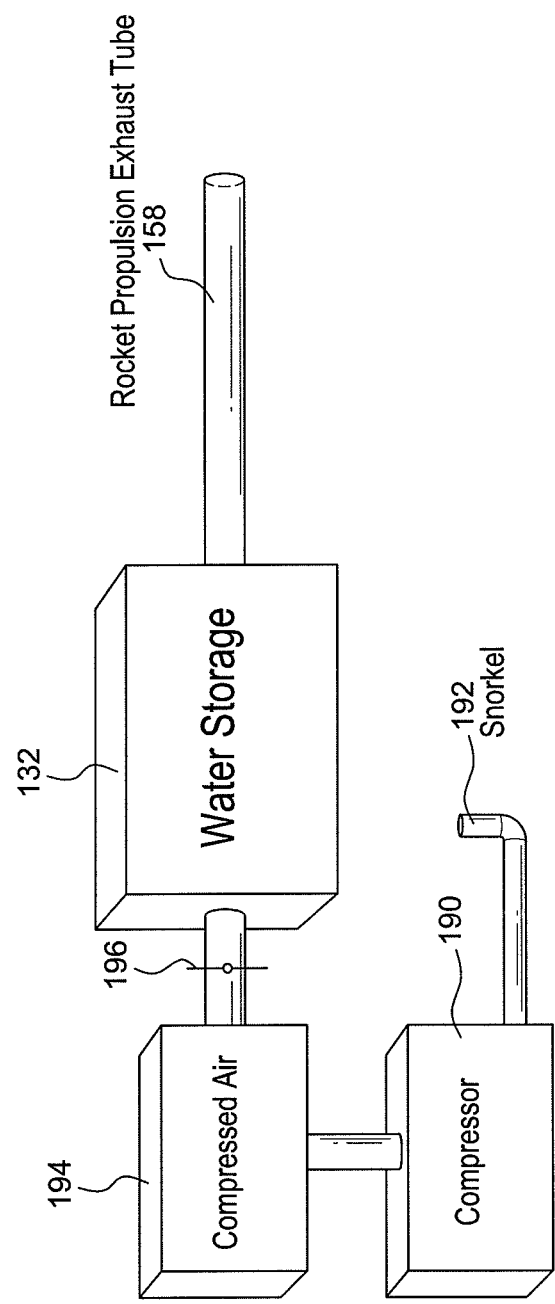
FIG. 17 illustrates a compressed air rocket propulsion system for use in the combined submersible vessel and unmanned aerial vehicle shown in FIG. 1 according to an embodiment of the present invention.

The propulsion system shown in FIG. 17 uses a compressor 190 (fed with air from a snorkel 192) to provide compressed air to tank 194. The stored compressed air is fed to the reservoir 132 through a valve 196, controlled by computer 124. The compressed air causes water in reservoir 132 to transit tube 158 under pressure, providing forward thrust to flying submarine 100.

Figure 18:
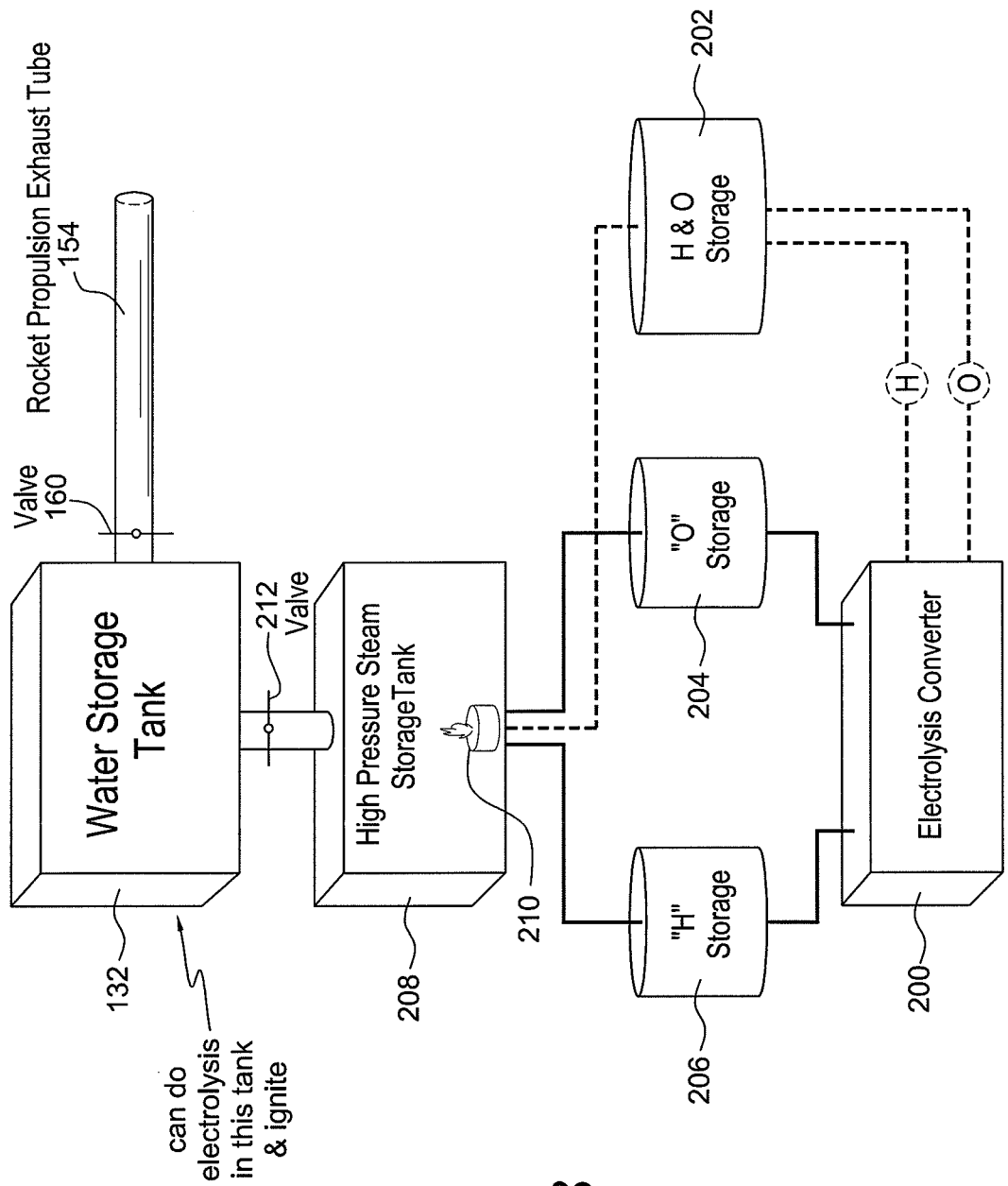
FIG. 18 illustrates an electrolysis converter rocket propulsion system for use in the combined submersible vessel and unmanned aerial vehicle shown in FIG. 1 according to an embodiment of the present invention.

The propulsion system shown in FIG. 18 uses an electrolysis converter rocket propulsion system. At least one electrolysis converter 200 is configured to convert water from water storage tank 202 into oxygen that is stored in oxygen storage tank 204 and hydrogen that is stored in hydrogen storage tank 206. At least one high pressure steam storage tank 208 includes a burner or igniter 210 and is configured to mix and burn the stored hydrogen and oxygen, to produce high pressure steam. The high pressure steam storage tank 208 is further configured to release the high pressure steam through computer-controlled valve 212 into the reservoir 132, where the steam forcibly expels water stored therein out of the rocket propulsion system exhaust tube 154, thereby providing the exhaust propulsive matter from the rocket propulsion system to propel the flying submarine 100.

According to the embodiment shown in FIG. 19, a single propulsion system that is designed to operate efficiently both in the air and in the water is used in flying submarine 100. A single motor 144 and dual-speed gearbox 152 provide an efficient method to turn a propeller both in the air and in the water. Flying submarine 100 can use a single propeller 146 optimized for greater than about 80% efficiency in both the air and in the water. The propeller 146 preferably has a latching/pivot mechanism 156 that allows the blades to be stowed forward for tube launch and aft for water entry and exit. According to this embodiment, the motor 144 will produce about 700 watts of power, weigh less than 0.5 kg (with controller), and is greater than about 90% efficient. The gearbox 152 has a first set of gears with a first gear ratio (e.g., 3:1 to 12:1, depending on the nominal operating RPM of the motor), and a second set of gears with a second gear ratio (e.g., 18:1 to 60:1 respectively). When the motor 144 is operating with the first set of gears, the propeller 146 is configured to operate within a first set of RPM values (e.g., 2000 rpm to 3000 rpm for flight in air). When the motor is operating with the second set of gears, the propeller is configured to operate within the second set of RPM values (e.g., 10 rpm to 500 rpm for cruise under water). Preferably, the first set of gears is configured to rotate the propeller in a rotational direction opposite that of the motor, and the second set of gears is configured to rotate the propeller in a rotational direction identical to that of the motor.

Figure 19A:
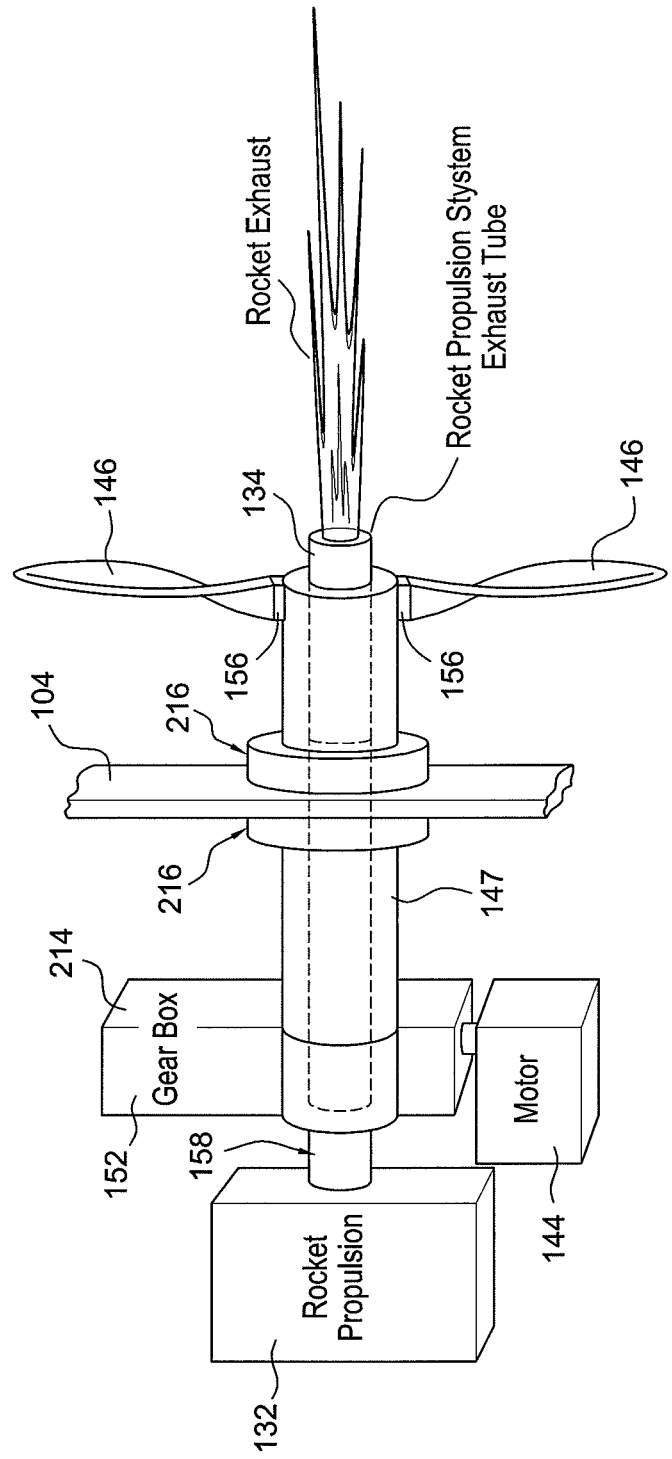
FIG. 19a illustrates a simplified schematic diagram of an interface between a rocket propulsion system and a propeller propulsion system for the combined submersible vessel and unmanned aerial vehicle shown in FIG. 1 according to an embodiment of the present invention.
Figure 19B:
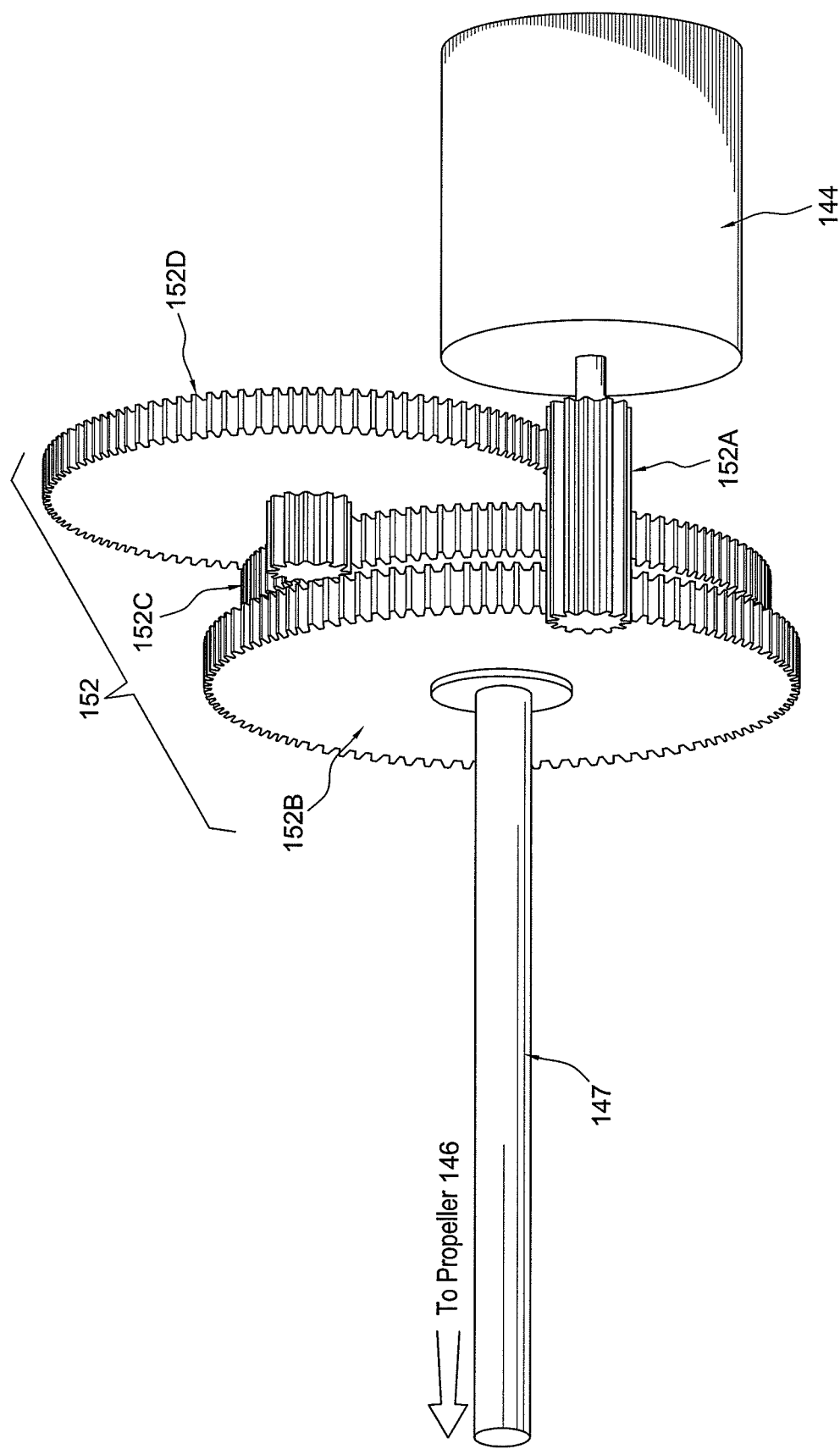
FIGS. 19b, c, d, and e show more details of the gearing.
Figure 19C:
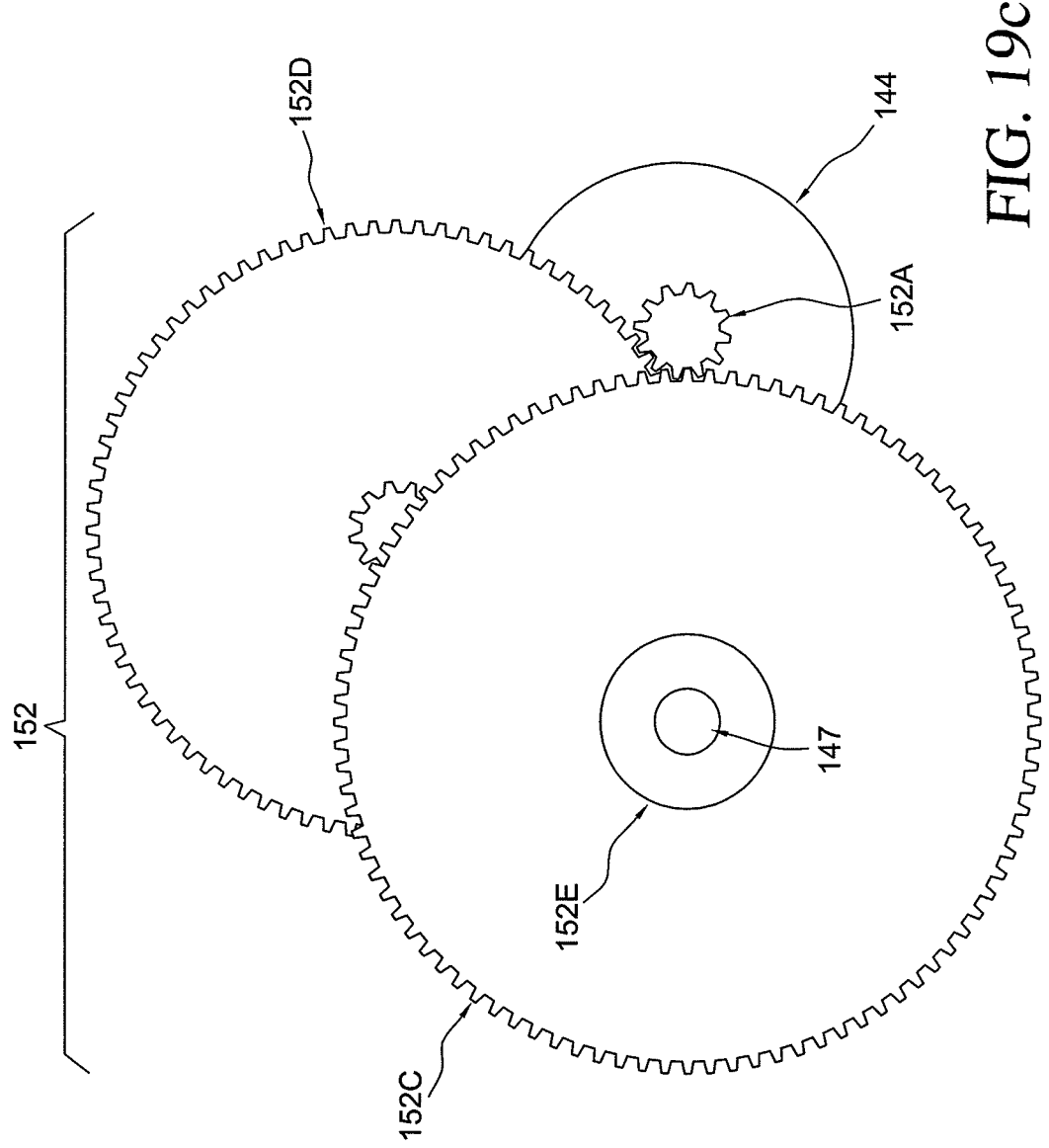
FIG. 19c shows a view looking forwards along the output shaft.
Figure 19D:
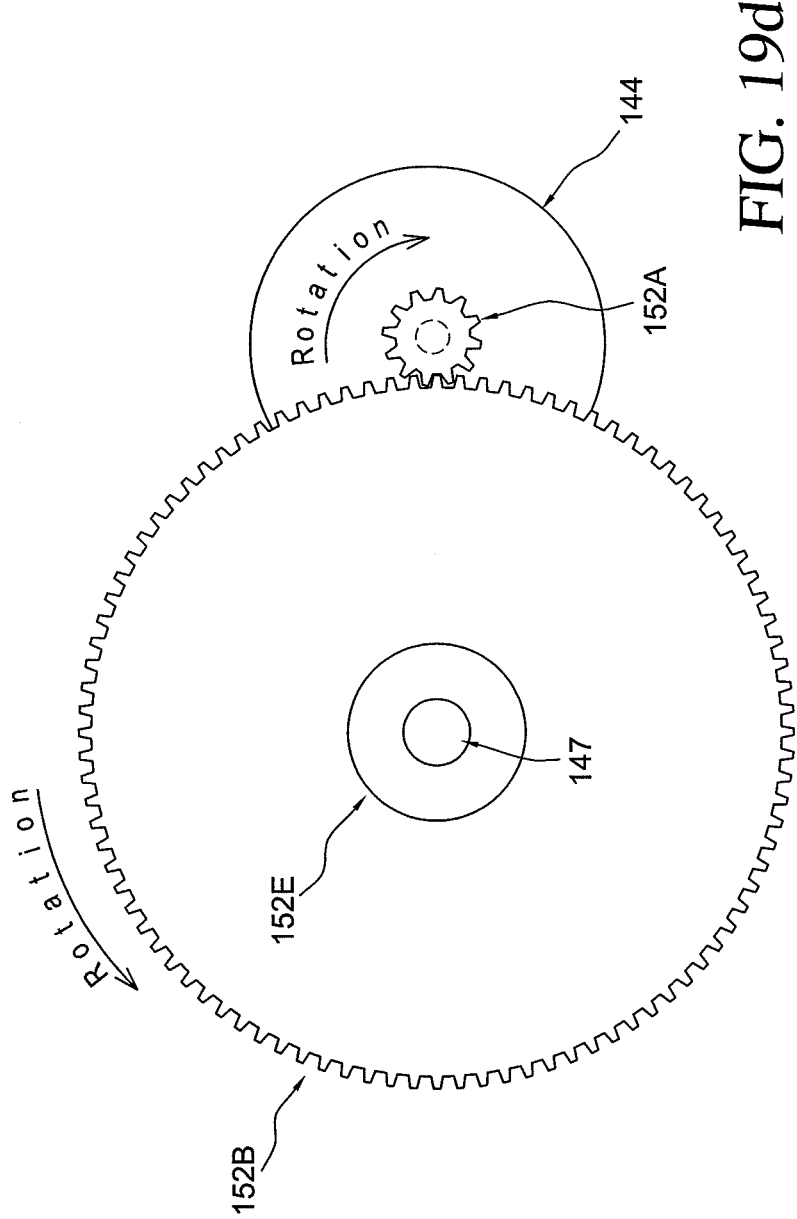
Figure 19E:
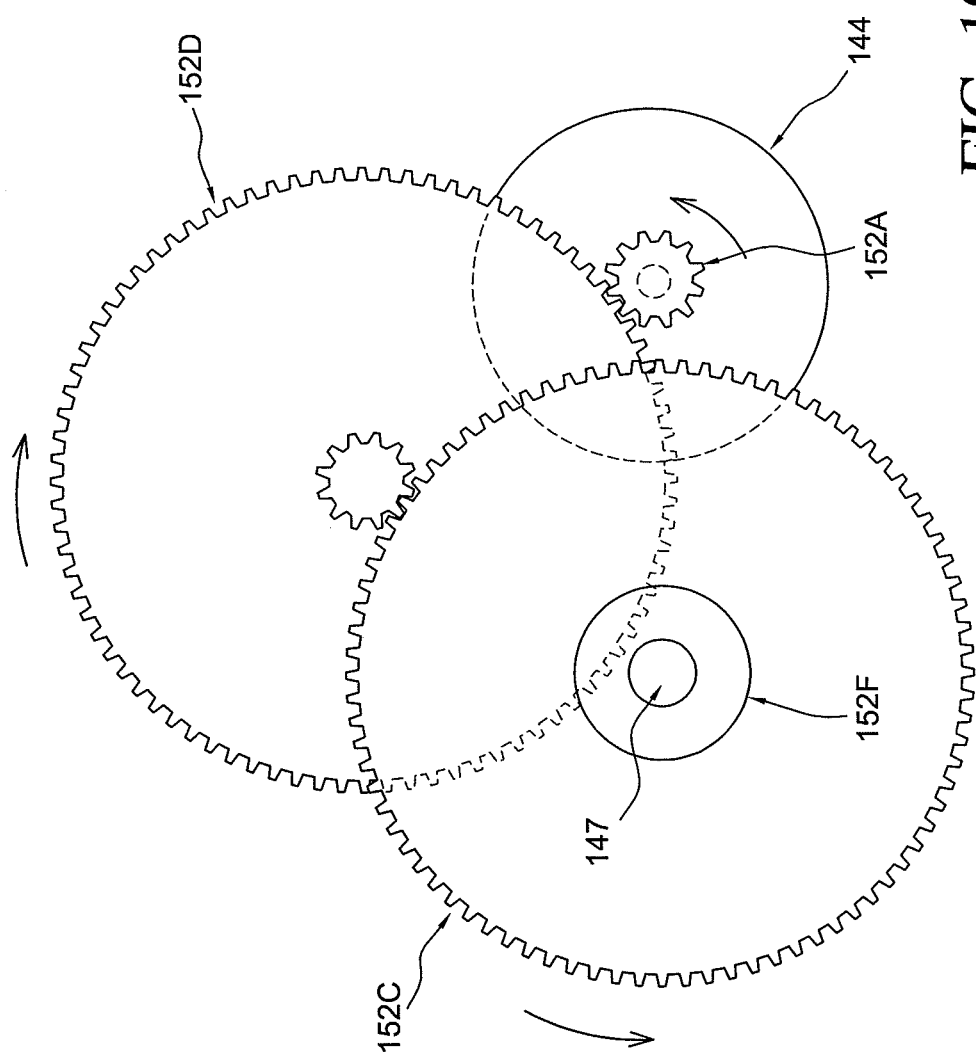
FIG. 19e shows only the low speed gears.

Details of the gearbox are shown in FIGS. 19a, b, c, d, and e. FIG. 19b shows a preferred design for the gearbox in an oblique view. FIG. 19c shows a view looking forwards along the output shaft. FIG. 19d shows only the high speed gears, while FIG. 19e shows only the low speed gears. Preferably, each of the first set of gears and the second set of gears is mechanically coupled to a propeller shaft 147 via a one way clutches 152 E and 152 F respectively, for example, a ratchet or roller needle clutch, sometimes called a "Sprague" clutch.

Preferably, the one way clutches 152E and F are configured to rotate the propeller in a forward direction regardless of the rotation direction of the motor. In the high RPM case, shown in FIG. 19d, the motor has a pinion gear 152A which drives a spur gear 152B on the shaft, where the hub of the spur gear contains the one way clutch 152E such that torque is only transferred from the gear to the shaft when the gear is driven in the appropriate direction, as shown by the rotation arrows in the drawing. In the low RPM case, shown in FIG. 19e, the motor has a pinion gear. 152A which drives a spur part of cluster gear 152D on a secondary or "lay" shaft. This shaft contains the pinion part of cluster gear 152D, which then drives a spur gear 152C on the main output shaft said main shaft spur gear also has a one way clutch 152F in its hub to shaft connection. The extra stage of gearing results in reverse rotation, as shown by the rotation arrows and provides an extra reduction ratio of approximately 6:1. Note that the output shaft always rotates in the same direction, such that the propeller will drive the vehicle forwards. However, the rotation of the motor is opposite for the two cases. Thus the mode of the gearbox is controlled by the rotation direction of the motor, and that is easily controlled by the control computer via the motor drive electronics. The RPM of the propeller thus corresponds to the RPM of the motor 144 and the respective gear ratios of the first gear set and the second gear set. Preferably, a magnetic coupler 216 is mechanically coupled to the driveshaft 147 and the aft bulkhead of hull 104. The magnetic coupler 216 is mechanically coupled to the aft bulkhead of hull 104 and magnetically coupled to the aft propeller shaft 147. The magnetic coupler 216 is configured to rotate the aft propeller shaft 147 via the magnetic coupling between the magnetic coupler and the propeller shaft. Of course, the magnetic coupler 216 could be disposed before the gearbox 152, and the gearbox 152 could be placed outside the hull 104.

Figure 20:
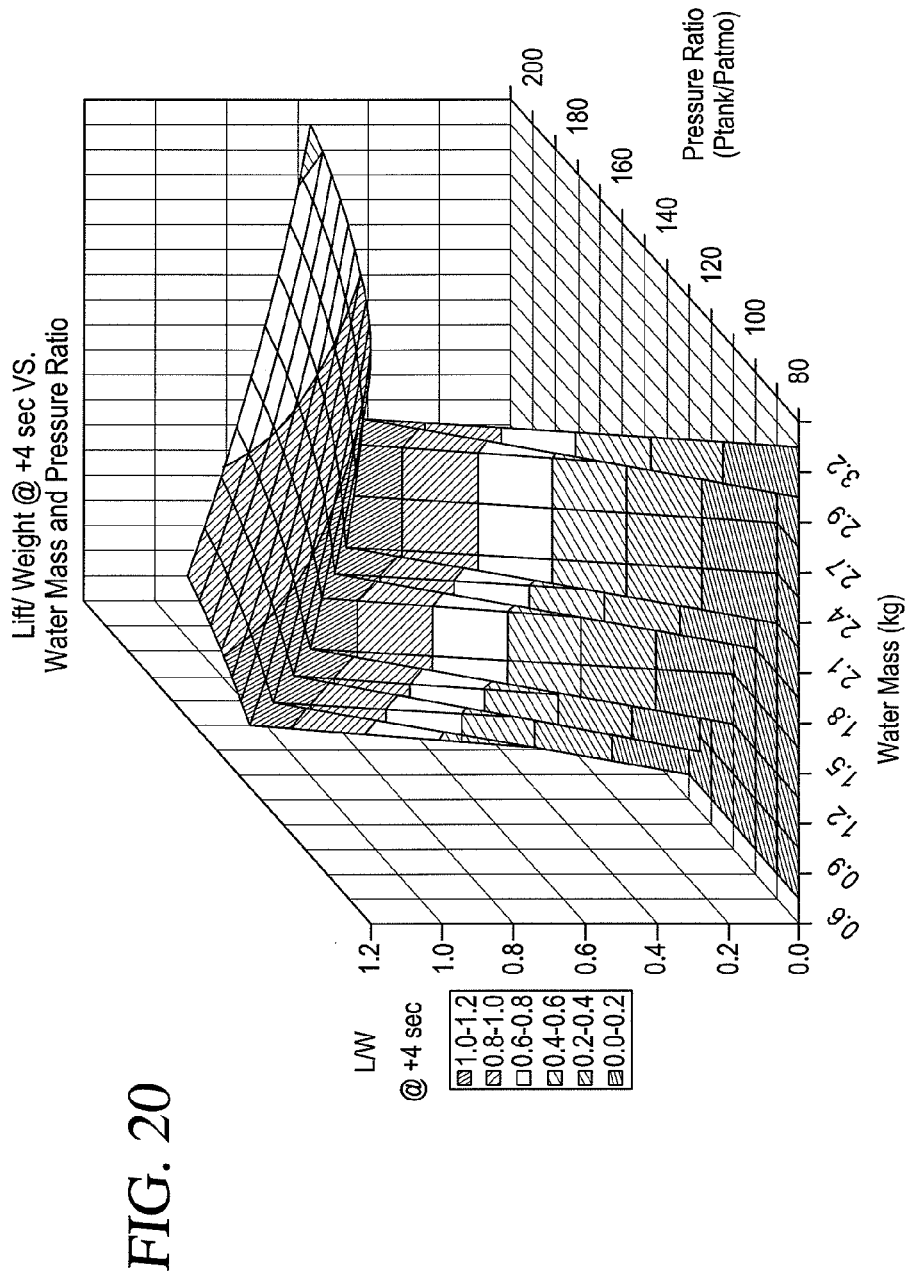
FIG. 20 illustrates relationships between lift-to-weight ratios of the combined submersible vessel and unmanned aerial vehicle shown in FIG. 1 and water mass and pressure ratios according to an embodiment of the present invention.
Figure 21:
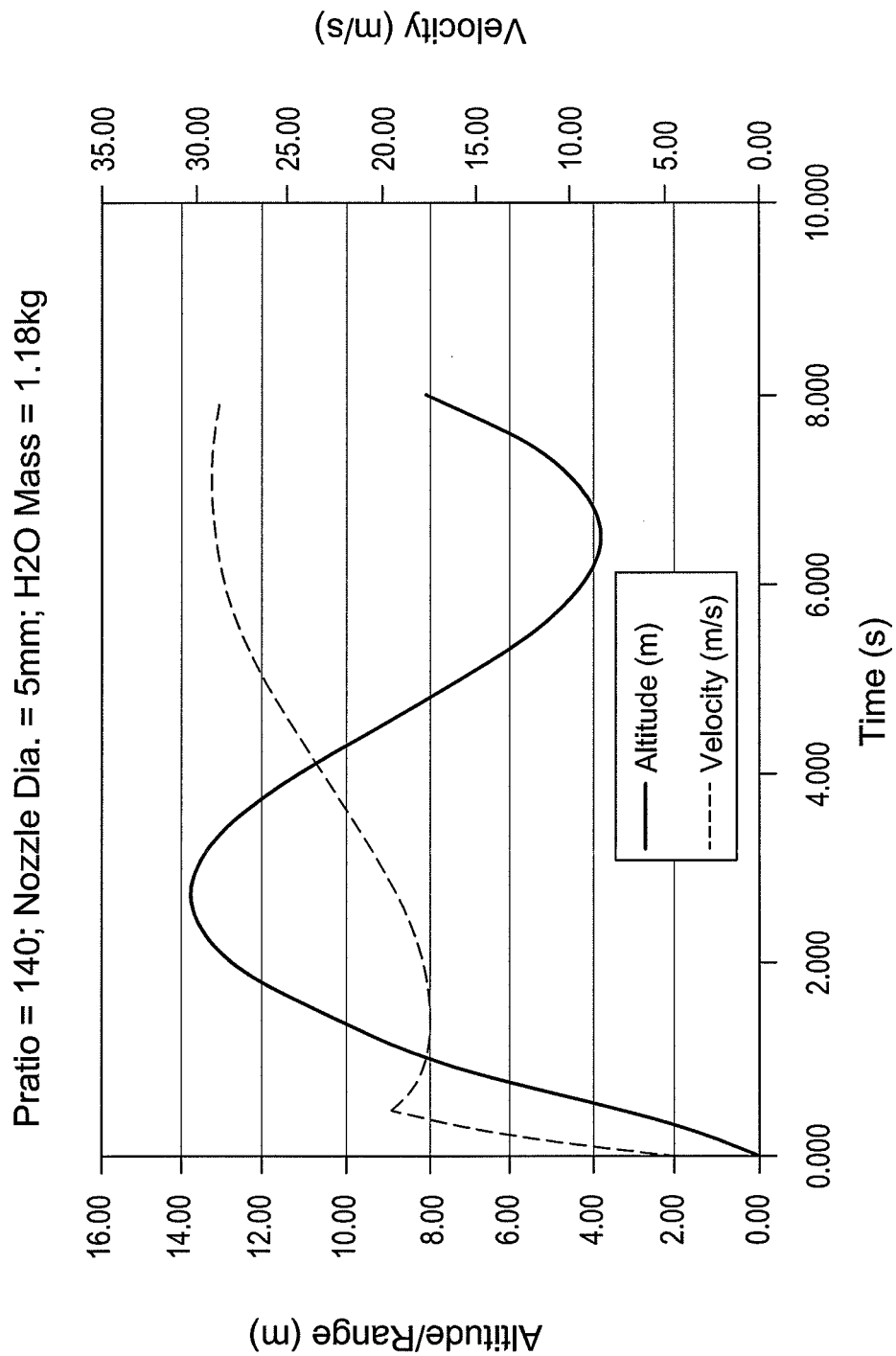
FIG. 21 illustrates relationships between altitude and range during exit from the water, for the combined submersible vessel and unmanned aerial vehicle shown in FIG. 1 and velocity and time according to an embodiment of the present invention.

FIG. 20 shows the relationships between lift-to-weight ratios of the flying submarine 100 shown in FIG. 1 and water mass and pressure ratios according to the preferred embodiment of the present invention. FIG. 21 illustrates the relationships between altitude and range during a typical launch from the water into the air for the flying submarine 100 shown in FIG. 1 and velocity and time according to the preferred embodiment of the present invention. FIG. 22 shows several performance parameters the flying submarine 100 shown in FIG. 1.

The individual components shown in outline or designated by blocks in the attached Drawings are all well-known in the aerospace and sea-vessel arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. patents discussed above are hereby incorporated by reference into the Detailed Description of the Preferred Embodiments.

What is claimed is:

1. A flying submarine, comprising:
    a body structure including a hull;
    at least one wing structure coupled to the body structure;
    at least one horizontal stabilizer structure coupled to the body structure; and
    a propulsion system coupled to the body structure and configured to propel the flying submarine in both airborne flight and underwater operation, wherein the propulsion system includes:
        a motor;
        a gearbox coupled to the motor and configured to receive power generated by the motor and provide variable output power;
        a drive shaft coupled to the gearbox and configured to transfer the variable output power provided by the gearbox, the drive shaft being a hollow shaft;
        a propeller coupled to the drive shaft and configured to accept power transferred to it from the drive shaft, and further configured to rotate and propel the flying submarine in both an airborne environment and in an underwater environment; and
        a rocket propulsion system having an exhaust tube concentrically located within the drive shaft.

2. The flying submarine according to claim 1, wherein the propulsion system is further configured to (i) operate the propeller within a first RPM range when operating in an air environment, and (ii) operate the propeller within a second RPM range when operating in a water environment, and wherein a first set of RPM values in the first RPM range are greater than a second set of RPM values in the second RPM range.

3. The flying submarine according to claim 1, wherein the propeller comprises at least two blades, wherein the propeller is disposed at a tail end of the flying submarine, opposite a nose of the flying submarine, and wherein the at least two blades are configured to fold forward and backward with respect to the nose of the flying submarine.

4. The flying submarine according to claim 3, wherein, when the flying submarine is in a stored configuration, the at least two blades of the propeller are folded forwards, towards the nose of the flying submarine.

5. The flying submarine according to claim 4, wherein, when the flying submarine is in a water entry configuration, the at least two blades of the propeller are folded backwards, away from the nose of the flying submarine.

6. The flying submarine according to claim 5, wherein, when the blades of the propeller are folded, structural loads thereon are reduced upon entry into the water environment.

7. The flying submarine according to claim 6, further comprising a latch configured to prevent the propeller from returning to a stored configuration following unfolding from the stored configuration.

8. The flying submarine according to claim 7, wherein the latch is further configured to be releasable following unfolding from the stored condition such that the propeller is stored again with the blades folded forward.

9. The flying submarine according to claim 1, further comprising: at least one battery, configured to store electrical energy, and wherein the motor comprises an electric motor configured to receive power from the battery.

10. The flying submarine according to claim 1, wherein the motor is further configured to rotate in both a clockwise direction and in counter-clockwise direction.

11. The flying submarine according to claim 1, the motor is rotatable in two directions.

12. The flying submarine according to claim 1, wherein the gearbox comprises a plurality of gear sets configured to operate the propeller within a first set of RPM values in the airborne environment, and to operate the propeller within a second set of RPM values in the underwater environment.

13. The flying submarine according to claim 12, wherein the plurality of gear sets comprises:
a first set of gears with a first gear ratio; and
a second set of gears with a second gear ratio, and wherein, when the motor is operating with the first set of gears, the propeller is configured to operate within the first set of RPM values, and wherein, when the motor is operating with the second set of gears, the propeller is configured to operate within the second set of RPM values.

14. The flying submarine according to claim 13, wherein the first set of gears is configured to rotate the propeller in a rotational direction opposite that of the motor, and wherein the second set of gears is configured to rotate the propeller in a rotational direction identical to that of the motor.

15. The flying submarine according to claim 13, wherein each of the first set of gears and the second set of gears is mechanically coupled to a propeller shaft via a one way clutch.

16. The flying submarine according to claim 15, wherein the one way clutch is selected from the group consisting of a ratchet, and a roller needle clutch.

17. The flying submarine according to claim 15, wherein the one way clutch is configured to rotate the propeller in a forward direction regardless of the rotation direction of the motor, and further wherein an RPM of the propeller corresponds to (i) the RPM of the motor and (ii) the respective gear ratios of the first gear set and the second gear set.

18. The flying submarine according to claim 1, further comprising:
a magnetic coupler
(i) mechanically coupled to the driveshaft, and
(ii) mechanically coupled to said hull,
wherein the magnetic coupler is configured to rotate the drive shaft via the magnetic coupling between the magnetic coupler and the drive shaft.

19. The flying submarine according to claim 1, wherein the rocket propulsion system is configured to launch the flying submarine out of the water environment and into the air environment.

20. The flying submarine according to claim 1, wherein the rocket propulsion system is configured to exhaust propulsive matter through the exhaust tube without substantially interfering with, or impinging on, the propeller.

21. The flying submarine according to claim 1, wherein the rocket propulsion system comprises:
at least one water storage tank coupled to the rocket propulsion system exhaust tube and configured to store water; and
at least one solid fuel hot gas generator combined with the at least one water storage tank, and wherein the at least one solid fuel hot gas generator is configured to burn solid fuel to create pressurized gas, wherein the pressurized gas forcibly expels water stored within the at least one water storage tank out of the rocket propulsion system exhaust tube, thereby providing the exhaust propulsive matter from the rocket propulsion system to propel the flying submarine.

22. The flying submarine according to claim 1, wherein the rocket propulsion system comprises:
at least one water storage tank coupled to the rocket propulsion system exhaust tube and configured to store water;
at least one high pressure storage tank coupled to the at least one water storage tank and configured to store pressurized gas; and
at least one solid fuel hot gas generator configured to burn solid fuel to create pressurized gas, wherein the pressurized gas is stored in the at least one high pressure storage tank, and wherein the at least one high pressure gas storage tank is further configured to release the hot pressurized gas into the at least one water storage tank to forcibly expel water stored within the at least one water storage tank out of the rocket propulsion system exhaust tube, thereby providing the exhaust propulsive matter from the rocket propulsion system to propel the flying submarine.

23. The flying submarine according to claim 22, wherein the at least one solid fuel hot gas generator is further configured to burn a plurality of solid fuel cells to create a high pressure gas a plurality of times.

24. The flying submarine according to claim 23, wherein, for each burn of a solid fuel cell, the high pressure gas is stored in the at least one high pressure storage tank.

25. The flying submarine according to claim 1, wherein the rocket propulsion system comprises:
at least one compressor configured to compress air; and
at least one compressed air storage tank configured to store compressed air, and wherein the least one compressed air storage tank is further configured to release the compressed air into the at least one water storage tank to forcibly expel water stored within the at least one water storage tank out of the rocket propulsion system exhaust tube, thereby providing the exhaust propulsive matter from the rocket propulsion system to propel the flying submarine.

26. The flying submarine according to claim 25, further comprising: a snorkel connected to the at least one compressor, and wherein the at least one compressor is further configured to replenish compressed air within the at least one compressed air storage tank via the snorkel.

27. The flying submarine according to claim 26, wherein air is replenished within the at least one compressed air storage tank while the flying submarine is under water or in the air.

28. The flying submarine according to claim 1, further comprising:
at least one a hydrogen storage tank;
at least one oxygen storage tank;
at least one electrolysis converter, wherein the at least one electrolysis converter is configured to (i) convert water into oxygen and hydrogen through an electrolysis process, (ii) store the oxygen in the at least one oxygen storage tank, and (iii) store the hydrogen in the at least one hydrogen storage tank; and
at least one high pressure steam storage tank that includes a burner,
wherein the at least one high pressure steam storage tank is configured to mix and burn the stored hydrogen and oxygen and produce high pressure steam, and wherein the at least one high pressure steam storage tank is further configured to release the high pressure steam into the at least one water storage tank to forcibly expel water stored within the at least one water storage tank out of the rocket propulsion system exhaust tube, thereby providing the exhaust propulsive matter from the rocket propulsion system to propel the flying submarine.

29. The flying submarine according to claim 1, further comprising:
at least one hydrogen and oxygen storage tank;
at least one electrolysis converter, wherein the at least one electrolysis converter is configured to (i) convert water into oxygen and hydrogen, and (ii) store the oxygen and the hydrogen in the at least one hydrogen and oxygen storage tank; and at least one high pressure steam storage tank that includes a burner, wherein the at least one high pressure steam storage tank is configured to burn the stored hydrogen and oxygen and produce high pressure steam, and wherein the at least one high pressure steam storage tank is further configured to release the high pressure steam into the at least one water storage tank to forcibly expel water stored within the at least one water storage tank out of the rocket propulsion system exhaust tube, thereby providing the exhaust propulsive matter from the rocket propulsion system to propel the flying submarine.

30. The flying submarine according to claim 1, further comprising:
   at least one water storage tank;
   at least one electrolysis converter configured to convert some of the water stored in the water storage tank into oxygen and hydrogen, and to store the oxygen and the hydrogen in the at least one water storage tank; and
   at least one igniter, wherein the at least one igniter is configured to ignite the stored hydrogen and oxygen and produce high pressure steam within the water storage tank, thereby forcibly expelling water remaining within the at least one water storage tank out of the rocket propulsion system exhaust tube, thereby providing the exhaust propulsive matter from the rocket propulsion system to propel the flying submarine.

31. The flying submarine according to claim 1, further comprising a water storage tank configured to provide ballast for the flying submarine.

32. The flying submarine according to claim 1, further comprising:
   at least one electrical storage battery; and
   an electrical power system including at least one solar photovoltaic cell mounted on a top side of the at least one wing structure, and wherein the electrical power system is further configured to recharge the at least one electrical storage battery during at least one of (i) the flying submarine being disposed just below a surface of the water, and (ii) the flying submarine cruising just below the surface of the water.

33. The flying submarine according to claim 1, further comprising a hydro-spike disposed at a nose of the body structure and configured to enter the water before the nose of the flying submarine as the flying submarine enters into the water environment to minimize impact loads on the nose of the flying submarine, wherein, prior to entering the water environment, the flying submarine is configured to fly at an altitude below about 100 feet and while at an airspeed just above a stalling speed of the flying submarine, wherein the flying submarine is further configured to reduce its speed to just below its stalling speed, and wherein the flying submarine is further configured to enter the water nose first and at an angle of between about 40° and 90° with respect to a surface of the water environment.

34. The flying submarine according to claim 33, wherein, when the flying submarine enters the water environment, the at least one wing structure, the at least one vertical stabilizer structure, and the at least one horizontal stabilizer structure fold into a water entry configuration.

35. The flying submarine according to claim 33, wherein the hydro-spike is further configured to move outwardly from the nose of the flying submarine.

36. The flying submarine according to claim 33, wherein the hydro-spike comprises:
   a shaft; and
   a water deflecting surface attached to an extendible end of the hydro-spike shaft.

37. The flying submarine according to claim 33, wherein the hydro-spike is further configured to break a surface of the water environment, and is further configured to mix the water with air to lessen an impact of a nose of the flying submarine into the water environment.

38. The flying submarine according to claim 1, wherein the at least one wing structure is configured to move between (i) a storage position, (ii) an airborne flight position, (iii) an underwater ascending position, (iv) an underwater descending position, (v) an underwater neutral-depth position, (vi) a water environment entry position, and (vii) a water exiting position.

39. The flying submarine according to claim 38, wherein the underwater ascending position comprises:
   a partially or fully extended at least one wing structure; and
   an inverted flying submarine, such that when the flying submarine is inverted, a lift vector of the partially or fully extended at least one wing structure is configured to push downwards the inverted flying submarine, thereby acting opposite to an upward buoyancy condition of the flying submarine, whereby the flying submarine is configured to glide upwards within the water environment.

* * * * *